US009247237B2

(12) United States Patent
Shi et al.

(10) Patent No.: US 9,247,237 B2
(45) Date of Patent: Jan. 26, 2016

(54) TECHNIQUES FOR WAVELET-BASED IMAGE DISPARITY ESTIMATION

(71) Applicants: Jianbo Shi, Philadelphia, PA (US); Daniel C. Middleton, Independence, MN (US)

(72) Inventors: Jianbo Shi, Philadelphia, PA (US); Daniel C. Middleton, Independence, MN (US)

(73) Assignee: INTEL CORPORATION, Santa Clara, CA (US)

( * ) Notice: Subject to any disclaimer, the term of this patent is extended or adjusted under 35 U.S.C. 154(b) by 625 days.

(21) Appl. No.: 13/712,679

(22) Filed: Dec. 12, 2012

(65) Prior Publication Data

US 2014/0160247 A1 Jun. 12, 2014

(51) Int. Cl.

*H04N 13/02* (2006.01)
*G06T 7/00* (2006.01)
*H04N 13/00* (2006.01)

(52) U.S. Cl.

CPC .......... *H04N 13/0239* (2013.01); *G06T 7/0022* (2013.01); *G06T 2207/20016* (2013.01); *G06T 2207/20064* (2013.01); *H04N 13/0242* (2013.01); *H04N 2013/0081* (2013.01)

(58) Field of Classification Search

CPC ........ H04N 19/14; H04N 19/60; H04N 19/63
See application file for complete search history.

(56) References Cited

U.S. PATENT DOCUMENTS

2013/0022288 A1* 1/2013 Sartor .................... G06T 5/002 382/266

* cited by examiner

*Primary Examiner* — Huy T Nguyen
(74) *Attorney, Agent, or Firm* — Kacvinsky Daisak Bluni PLLC

(57) ABSTRACT

Various embodiments are generally directed to repeated use of wavelet filters with different directional orientations each time to detect distances to edges in different directions in deriving a disparity map from multiple image bitmaps. A method includes subjecting an image bitmap to a first-order wavelet filter a selected number of times, an orientation of the first-order wavelet filter altered each time to create a first set of intermediate maps; and subjecting the first image bitmap to a second-order wavelet filter the selected number of times, an orientation of the second-order wavelet filter altered each time to create a second set of intermediate maps; the first-order and second-order wavelet filters, as well as their orientations, selected to be mathematically related such that the first-order wavelet filter approximates a sine function and the second-order wavelet filter approximates a related cosine function, both masked by a Gaussian. Other embodiments are described and claimed.

28 Claims, 14 Drawing Sheets

1000
camera array 111
assembly data 133
camera 110a
camera 110b
camera 110c
camera 110d
image bitmap 130a
image bitmap 130b
image bitmap 130c
image bitmap 130d
downsampling component 141
downsampled bitmap 131a
downsampled bitmap 131b
downsampled bitmap 131c
downsampled bitmap 131d
downsampled bitmap 132a
downsampled bitmap 132b
downsampled bitmap 132c
downsampled bitmap 132d

1000

TECHNIQUES FOR WAVELET-BASED IMAGE DISPARITY ESTIMATION

BACKGROUND

Numerous computer-based vision and image processing applications require the creation of disparity maps as part of extracting visual information for further processing. Such applications include stereo depth estimation, image enhancement, video stabilization, three-dimensional modeling, and human gesture decoding. Disparity maps may be used to identify visual data present in one image that is not present in another and/or to measure relative distances of objects from the location of the camera(s) taking the images.

Disparity maps are typically data structures made up of per-pixel indications of differences between two or more images. The two or more images are often captured by multiple cameras operated to substantially simultaneously capture separate images or a single camera operated to capture a succession of images separated by a recurring interval of time. The two or more images are then compared to find the disparities between them, and thereby generate one or more disparity maps. The disparity maps are then used to find corresponding regions between the compared images to identify like objects therebetween.

A time-honored technique of making such comparisons is to compare pixel intensities and record the differences in intensities between pixels of compared images as the pixels of a disparity map. Unfortunately, this reliance on pixel intensity renders this technique susceptible to inaccurate indications of disparities where two or more of the cameras used either are not or cannot be calibrated to provide substantially identical intensity measurements when capturing light of substantially the same intensity. This may arise due simply to normal variances in the manufacture of image sensors used in the cameras, and/or differences in environment between two image sensors (e.g., image sensors operating at different temperatures).

Further, even with correct calibration between multiple cameras or the use of the very same camera (such that calibration is not a factor) to capture each image, chance differences in lighting between different camera vantage points or over time through capturing successive images with the same camera can again bring about false differences in light intensities. The results are frequent false positives and/or negatives in detecting disparities. It is with respect to these and other considerations that the embodiments described herein are needed.

DETAILED DESCRIPTION

Figure 1:
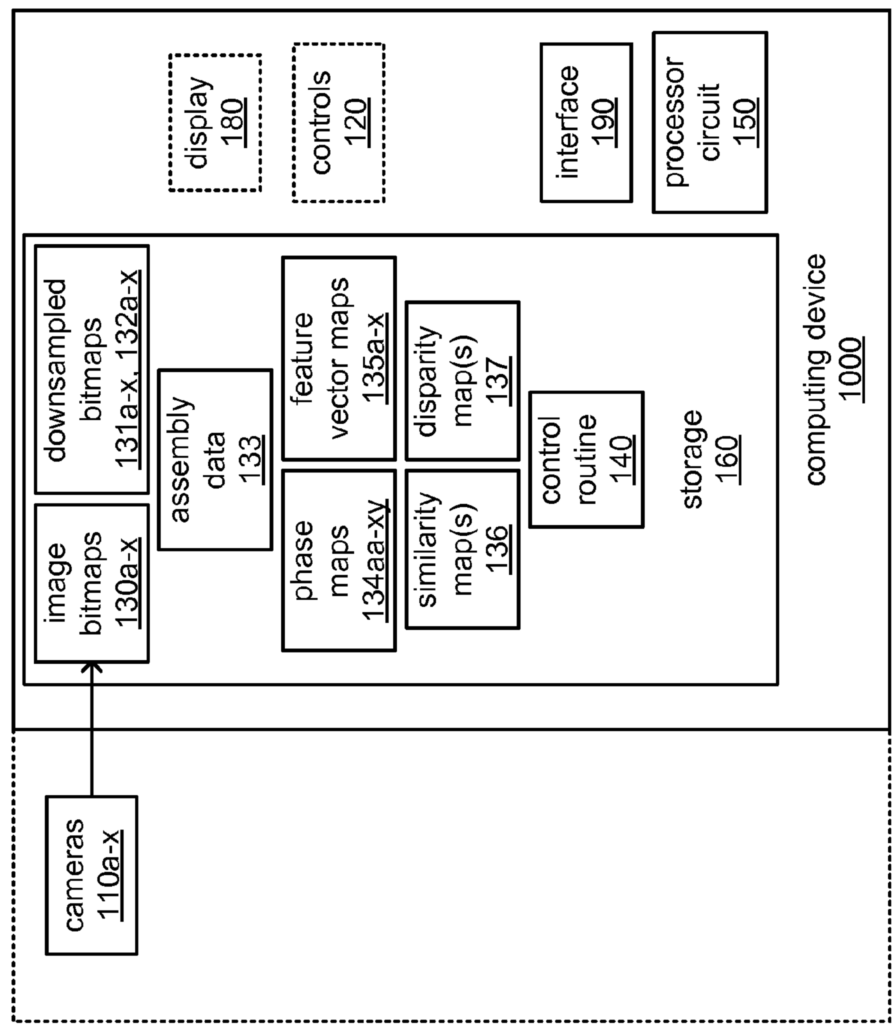
FIG. 1 illustrates an embodiment of a computing device deriving a disparity map.

Various embodiments are generally directed to the repeated use of wavelet filters set each time to different directional orientations to detect distances to edges in different directions in deriving a disparity map from multiple captured images of a common scene. More specifically, downsampled versions of each captured image of multiple captured images are created. Then, each of the captured images and their downsampled versions are subjected, multiple times, to both first and second order wavelet filters set to different orientations to derive phase maps indicative of distances of each pixel in each captured image and downsampled version to an edge in different directions.

For each one of the captured images, a single feature vector map is then generated from the multiple phase maps created at different orientations from that captured image and its downsampled versions. Then, the feature vector map corresponding to a one of the captured images that is designated as a reference is used for comparisons in which each of the other feature vector maps are compared to it, with each comparison creating a similarity map.

In some embodiments, only one similarity map is created as a result of there being only two captured images. In such embodiments, this single similarity map is analyzed to derive a single disparity map that becomes the final disparity used in further processing in whatever application for which a disparity map is required as an input.

However, in other embodiments, multiple similarity maps are created as a result of there being more than just two captured images. In such other embodiments, the multiple similarity maps are analyzed together, taking into account assembly data specifying the relative positions and distances of the vantage points from which the images were captured, to derive a single disparity map that becomes the final disparity map.

In still other embodiments where there are more than just two captured images such that multiple similarity maps are generated from comparisons of the single designated reference feature vector map to multiple others, a second set of such comparisons is made among the feature vector maps in which a different one of the feature vector maps is designated as a second reference to which all others are compared, thereby generating a second set of similarity maps. The similarity maps of this second set are then also analyzed, taking into account the assembly data specifying the relative positions and distances of the vantage points from which the images were captured, to derive a second single disparity map. These two disparity maps, each derived from a different one of the two sets of similarity maps, are then provided to consistency checking logic that employs information in the assembly data specifying the relative positions and distances of the two vantage points that correspond to the two feature vector maps designated as references in comparing the two disparity maps to detect false indications of edges or other features. Presuming a selected threshold of consistency is found to be met, either one of the two disparity maps may then be designated as the final disparity map.

In one embodiment, for example, a method includes receiving signals conveying a first image bitmap of a scene captured by a first camera; receiving signals conveying a second image bitmap of the scene captured by a second camera; subjecting the first image bitmap to a first-order wavelet filter a selected number of times, an orientation of the first-order wavelet filter altered each time to create an intermediate map of a first set of intermediate maps; and subjecting the first image bitmap to a second-order wavelet filter the selected number of times, an orientation of the second-order wavelet filter altered each time to create an intermediate map of a second set of intermediate maps, the first-order wavelet filter and the second-order wavelet filter selected to be mathematically related, and the orientations of the first-order wavelet filter and the second-order wavelet filter selected to be mathematically related such that the first-order wavelet filter approximates a sine function masked by a Gaussian and the second-order wavelet filter approximates a related cosine function also masked by a Gaussian. Other embodiments are described and claimed.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a computing device 1000 externally coupled to and/or internally incorporating cameras 110$a$-$x$. The computing device 1000 may be any of a variety of types of computing device, including without limitation, a desktop computer system, a data entry terminal, a laptop computer, a netbook computer, an ultrabook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

The computing device 1000 may be coupled to any of a variety of other computing devices via a network (not shown). That network may be a single network possibly limited to extending within a single building or other relatively limited area, a combination of connected networks possibly extending a considerable distance, and/or may include the Internet. Thus, such a network may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 1000 incorporates one or more of a processor circuit 150, a storage 160, controls 120, a display 180, and an interface 190. In some embodiments, the cameras 110$a$-$x$, though coupled to the computing device 1000 to convey captured images thereto, are not incorporated into the computing device 1000, itself. In such embodiments, the cameras 110$a$-$x$ may be coupled to the computing device 1000 via a network to which the computing device 1000 is also coupled via the interface 190, possibly the very same network by which the computing device 1000 may exchange data with one or more other computing devices. In other embodiments, the cameras 110$a$-$x$ are incorporated into the computing device 1000.

In some embodiments, the cameras 110$a$-$x$ may include a single camera operated to capture multiple images of a common scene with a recurring interval of time between image captures. However, it is envisioned that the cameras 110$a$-$x$ include two or more cameras forming an array to capture images of a common scene from different vantage points substantially simultaneously, thereby providing at least binocular image capture.

The storage 160 stores at least the control routine 140 and one or more of image bitmaps 130$a$-$x$, downsampled bitmaps 131$a$-$x$ and 132$a$-$x$, phase maps 134$aa$-$xy$, feature vector maps 135$a$-$x$, similarity map(s) 136, and disparity map(s) 137. An assembly data 133 may also be stored in the storage 160 and/or may be carried by a camera array formed from the cameras 110$a$-$x$. As will be explained in greater detail, the similarity maps 136($s$) may include one or more similarity maps depending on whether there are two or more of the cameras 1110$a$-$x$. As will also be explained in greater detail, the disparity map(s) 137 may include one or more disparity maps depending on whether at least a second disparity map is generated for consistency checking.

In executing the control routine 140, the processor circuit 150 is caused to receive multiple captured images captured by the cameras 110$a$-$x$, and store them as corresponding ones of the image bitmaps 130$a$-$x$. The processor circuit 150 then creates levels of downsampled versions of each of the captured images of the image bitmaps 130$a$-$x$, storing a first level of the downsampled versions as corresponding ones downsampled bitmaps 131$a$-$x$, and possibly storing a second level of the downsampled versions as corresponding ones of downsampled bitmaps 132$a$-$x$.

The processor circuit 150 is then caused to subject each of the image bitmaps 130$a$-$x$ and each of corresponding ones of the downsampled bitmaps 131$a$-$x$ and 132$a$-$x$, multiple times, to both first and second order wavelet filters set to different orientations to derive the phase maps 134$aa$-$xy$ indicative of distances of each pixel to edges in different directions. The processor circuit 150 is then caused to combine all of the phase maps of each one of the image bitmaps 130$a$-$x$ and its corresponding ones of the downsample bitmaps 131$a$-$x$ and 132$a$-$x$ into one of the feature vector maps 135$a$-$x$, such that each of the feature vector maps 135$a$-$x$ corresponds to one of the image bitmaps 130$a$-$x$, respectively.

One of the feature vector maps 135*a-x* is then designated as a first reference feature vector map to which the other ones of the feature vector maps 135*a-x* are compared by the processor circuit 150 in a first set of comparisons. Each such comparison generates a similarity map of a first set of similarity maps (possibly the only set of similarity maps) that is stored as part of the similarity map(s) 136. In embodiments in which only two images were captured (such that there are only image bitmaps 130*a* and 130*b*, and therefore, only feature vector maps 135*a* and 135*b*), only one such comparison can be made, and thus, only one similarity map is generated such that the similarity map(s) 136 includes only this one similarity map from this one comparison. In such embodiments, this single similarity map is analyzed to derive a single disparity map that is stored as the disparity map(s) 137. In such embodiments, this one disparity map making up the disparity map(s) 137 becomes the final disparity map that is provided to whatever other computer vision or image processing functions are to be performed as part of whatever application for which the image bitmaps 130*a* and 130*b* were captured.

In other embodiments where more than two images were captured (such that there are more than only image bitmaps 130*a* and 130*b*, and therefore, more than only feature vector maps 135*a* and 135*b*—there is also at least an image bitmap 130*c* and at least a feature vector map 135*c*), the first set of similarity maps stored as the similarity maps 136 includes more than one similarity map. In such other embodiments, the multiple similarity maps are analyzed together, taking into account the assembly data 133 specifying the relative positions and orientations of the vantage points of the cameras 110*a-x* from which each of the image bitmaps 130*a-x* were captured, to derive a single disparity map. Where this single disparity map is not to be subjected to consistency checking, this single disparity map becomes the final disparity map.

In still other embodiments where there are more than two image bitmaps (and accordingly, more than two feature vector maps) and where a consistency check of the one disparity map derived from the first set of similarity maps, another one of the feature vector maps 135*a-x* is designated as a second reference feature vector map to which the others of the feature vector maps 135*a-x* are compared by the processor circuit 150 in a second set of comparisons. Each such comparison generates a similarity map of a second set of similarity maps that is also stored as part of the similarity map(s) 136 (along with the first set of similarity maps). The multiple similarity maps of this second set of similarity maps are analyzed together, again taking into account the assembly data 133, to derive a second single disparity map. These two disparity maps of the disparity map(s) 137 are then subjected to a consistency check that employs information in the assembly data 133. Presuming a selected threshold of consistency is found to be met, either one of these two disparity maps making up the disparity map(s) 137 may then be designated as the final disparity map.

In various embodiments, the processor circuit 150 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may include a multi-core processor (whether the multiple cores coexist on the same or separate dies), and/or a multi-processor architecture of some other variety by which multiple physically separate processors are in some way linked.

In various embodiments, the storage 160 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may be made up of multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 190 may employ any of a wide variety of signaling technologies enabling the computing device 1000 to be coupled to other devices as has been described. Each of these interfaces includes circuitry providing at least some of the requisite functionality to enable such coupling. However, this interface may also be at least partially implemented with sequences of instructions executed by the processor circuit 150 (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
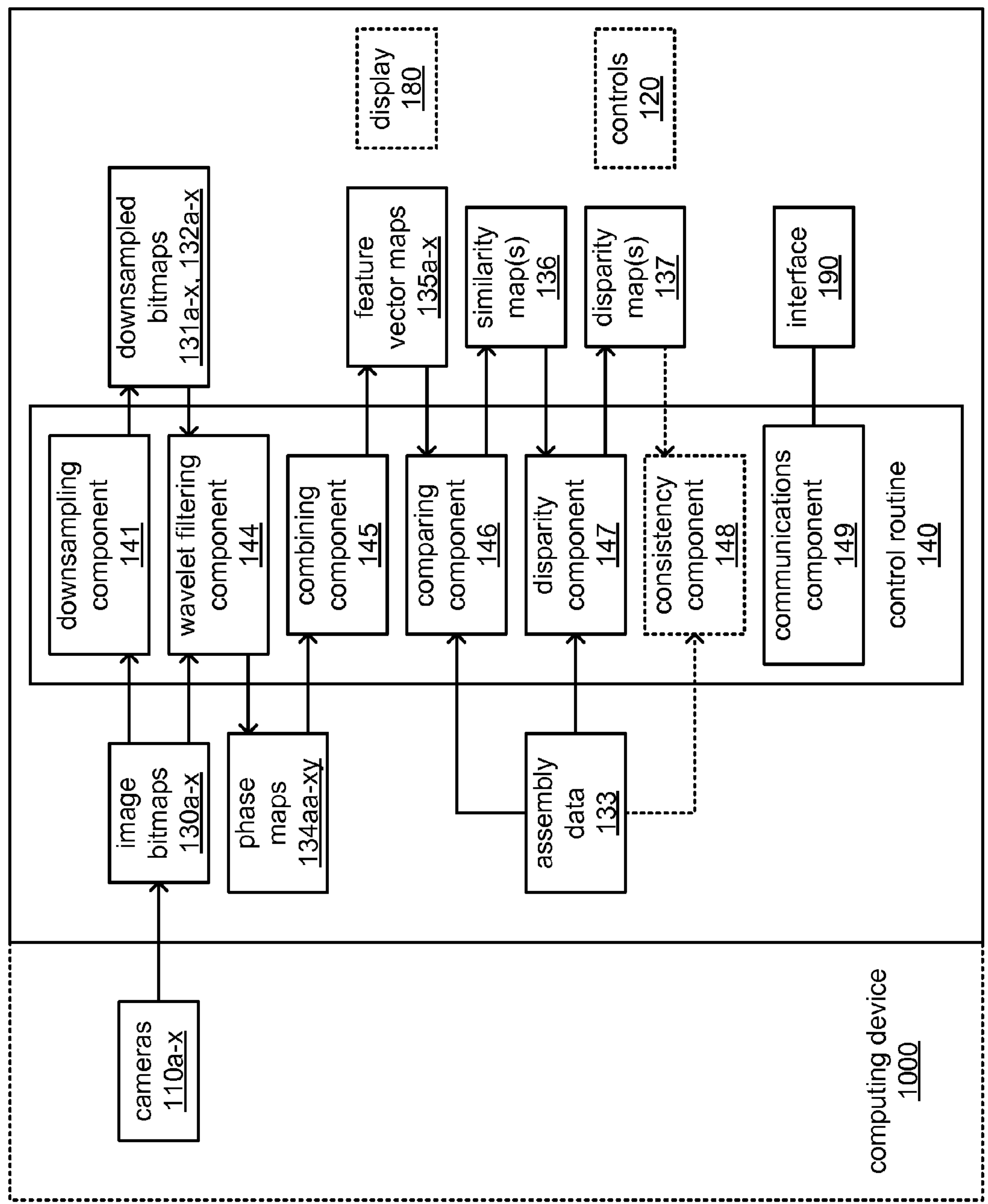
FIG. 2 illustrates a portion of the embodiment of FIG. 1, depicting various possible implementation details.

FIG. 2 illustrates a block diagram of portions of the block diagram of FIG. 1 depicted in greater detail. More specifically, aspects of the operating environments of the computing device 1000 are depicted, in which the processor circuit 150 (FIG. 1) is caused by execution of the control routine 140 to perform the aforedescribed functions. As will be recognized by those skilled in the art, the control routine 140, including the components of which it is composed, are selected to be operative on whatever type of processor or processors that are selected to implement the processor circuit 150. Further, FIGS. 3*a-b*, 4*a-b*, 5, 6, 7 and 8 each depict aspects of operation of components of the control routine 140 through the presentation of an example embodiment including four cameras 110*a-d* forming an example 1×4 camera array 111 (FIG. 3*b*) that each capture an image that is stored as a corresponding one of images bitmaps 130*a-d*. Although this example entails the use of four cameras substantially simultaneously capturing images of a common scene, other embodiments are possible employing other quantities of multiple cameras or employing a single camera capturing multiple images over a period of time. Further, it should be noted that although these four cameras 110*a-d* are depicted as organized into a 1×4 array, other embodiments are possible in which these same four cameras (or any number of cameras 110*a-x*) may be physically positioned relative to each other in any of a number of ways, including and not limited to, a 2×2, a "T" or "L" arrangement, etc.

In various embodiments, the control routine 140 may include a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150 and 350, including without limitation, Windows™, OS X™, Linux®, or Android OS™. Where one or more device drivers are included, those device drivers may provide support for any of a variety of other components, whether hardware or software components, that include the computing devices 1000.

The control routine 140 includes a communications component 149 executable by the processor circuit 150 to operate the interface 190 transmit and receive signals via the network 999 as has been described. As will be recognized by those skilled in the art, each of these communications components are selected to be operable with whatever type of interface technology is selected to implement each of the corresponding ones of these interfaces.

The control routine 140 includes a downsampling component 141 executable by the processor circuit 150 to create multiple levels of downsampled versions of each of the image bitmaps 130*a-d*. Specifically, and turning momentarily to FIG. 3*a*, each of the image bitmaps 130*a* through 130*d* are downsampled once to create downsampled bitmaps 131*a* through 131*d*, and then downsampled again to create downsampled bitmaps 132*a* through 132*d*, respectively. In such downsampling, conceivably any ratio of an original quantity of pixels to a downsampled quantity of pixels may be used. As depicted in this example, the first level of downsampling causes 2×2 arrays of four pixels in each of the image bitmaps 130*a-d* to be downsampled to a single pixel in corresponding ones of the downsampled bitmaps 131*a-d*. Then, the second level of downsampling causes 2×2 arrays of four pixels in each of the downsampled bitmaps 131*a-d* to be downsampled to a single pixel in corresponding ones of the downsampled bitmaps 132*a-d*. Thus, as depicted most clearly in the insets of the image bitmap 130*a* and each of the downsampled bitmaps 131*a* and 132*a*, 4×4 arrays of sixteen pixels of the image bitmap 130*a* ultimately correspond to a single pixel of the downsampled bitmap 132*a*.

Such progressive downsampling of bitmaps from higher resolutions to lower resolutions is sometimes referred to as "pyramid image processing." In some variants of pyramid image processing, the color, intensity and/or other per-pixel values associated with each of the multiple pixels that are downsampled to just one pixel are averaged, and the resulting single pixel is given those averaged values. In other variants, the values associated with only one of the multiple pixels that are downsampled are copied and given to the resulting single pixel, while the values associated with all of the others of those multiple pixels are not carried over to the resulting single pixel in any way. This latter variant of handling pixel values in downsampling is sometimes referred to as "decimation," since the values of only some pixels in the original bitmap are carried over to the resulting downsampled bitmap while the others are ignored.

As those skilled in the art will readily recognize, regardless of what is done with the per-pixel values, the downsampled bitmaps 131*a-d* and 132*a-d* necessarily provide less information than the originally captured image bitmaps 130*a-d*, respectively. However, these "coarser" representations of the captured images created by downsampling have the benefit of allowing an edge identification algorithm to focus on identifying the edges of larger objects, since the downsampling often results in the discarding of data enabling identification of edges of smaller objects. Stated differently, smaller objects become blurred or indistinct enough that their presence no longer distracts from identifying features of larger objects that are more likely to remain distinguishable in downsampled bitmaps.

Figure 3A:
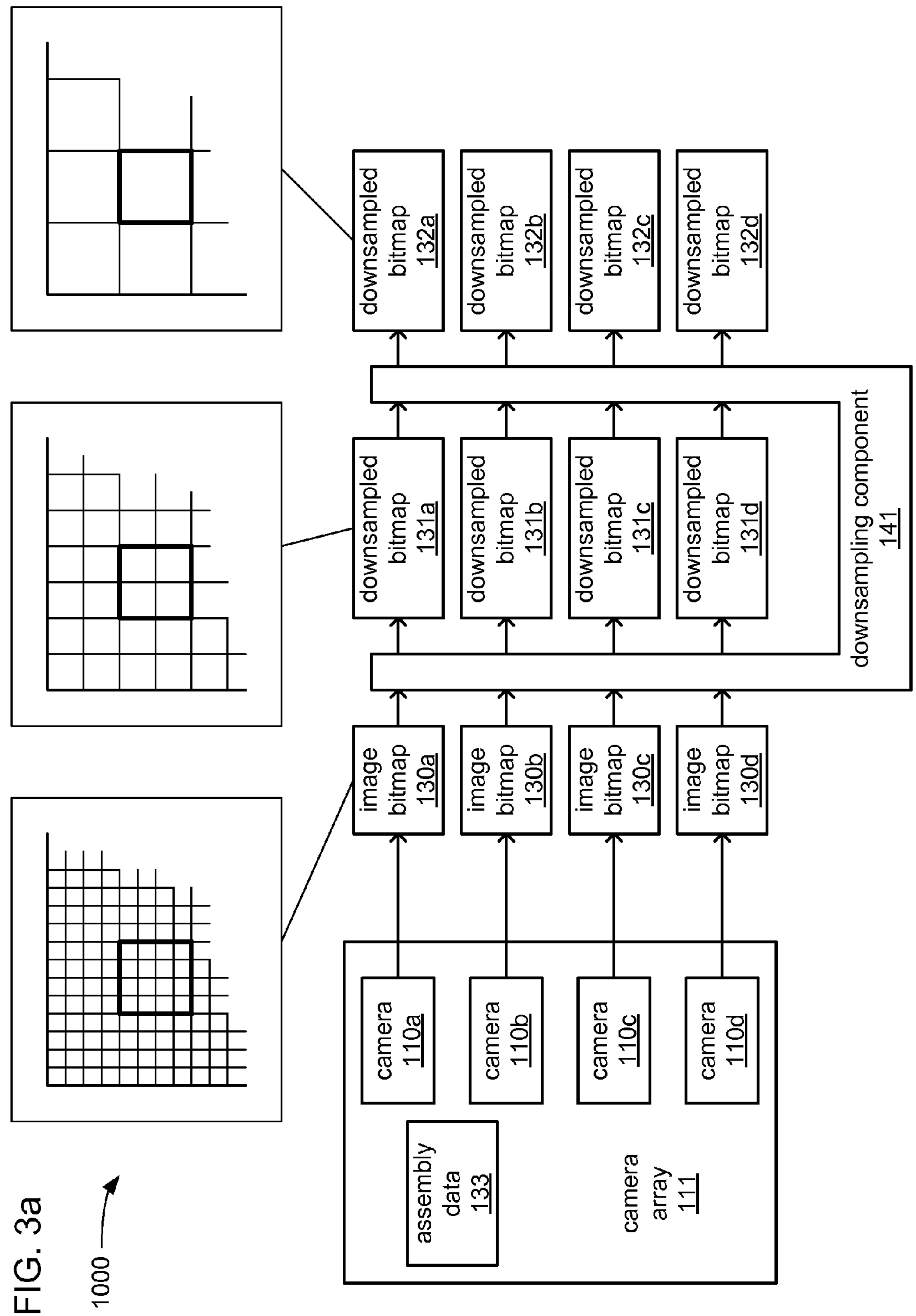
FIGS. 3*a-b*, 4*a-b*, 5, 6 and 7*a-b* illustrate aspects of an exemplary implementation of a subpart of the portion depicted in FIG. 2.

It should be noted that although two levels of downsampling are depicted in FIG. 3*a*, other embodiments are possible in which there may be any number of levels of downsampling. As those skilled in the art will readily recognize, there are diminishing returns in terms of the benefits afforded by continuing to increase the number of levels of downsampling, and what number of levels is useful is partially a function of the resolution of the original image. Thus, it is envisioned that a number of levels of downsampling will be determined through consideration of the resolution of the image bitmaps 130*a-d* along with how many levels are needed to aid in detection of lines of larger objects given the type of scenery that is expected to be captured in the bitmap images 130*a-d*.

Returning to FIG. 2, the control routine 140 includes a wavelet filtering component 144 executable by the processor circuit 150 to subject each of the image bitmaps 130*a-x* and corresponding ones of the downsampled bitmaps, multiple times, to both first and second order wavelet filters set to different orientations each time to derive phase maps indicative of distances of each pixel to an edge in different directions. Specifically, and turning momentarily to FIG. 4*a*, the image bitmap 130*a* and its downsampled bitmaps 131*a* and 132*a* are subjected to wavelet filters to derive the phase maps 134*aa-ac*; the image bitmap 130*b* and its downsampled bitmaps 131*b* and 132*b* are subjected to wavelet filters to derive the phase maps 134*ba-bc*; the image bitmap 130*c* and its downsampled bitmaps 131*c* and 132*c* are subjected to wavelet filters to derive the phase maps 134*ca-cc*; and the image bitmap 130*d* and its downsampled bitmaps 131*d* and 132*d* are subjected to wavelet filters to derive the phase maps 134*da-dc*.

Figure 4A:
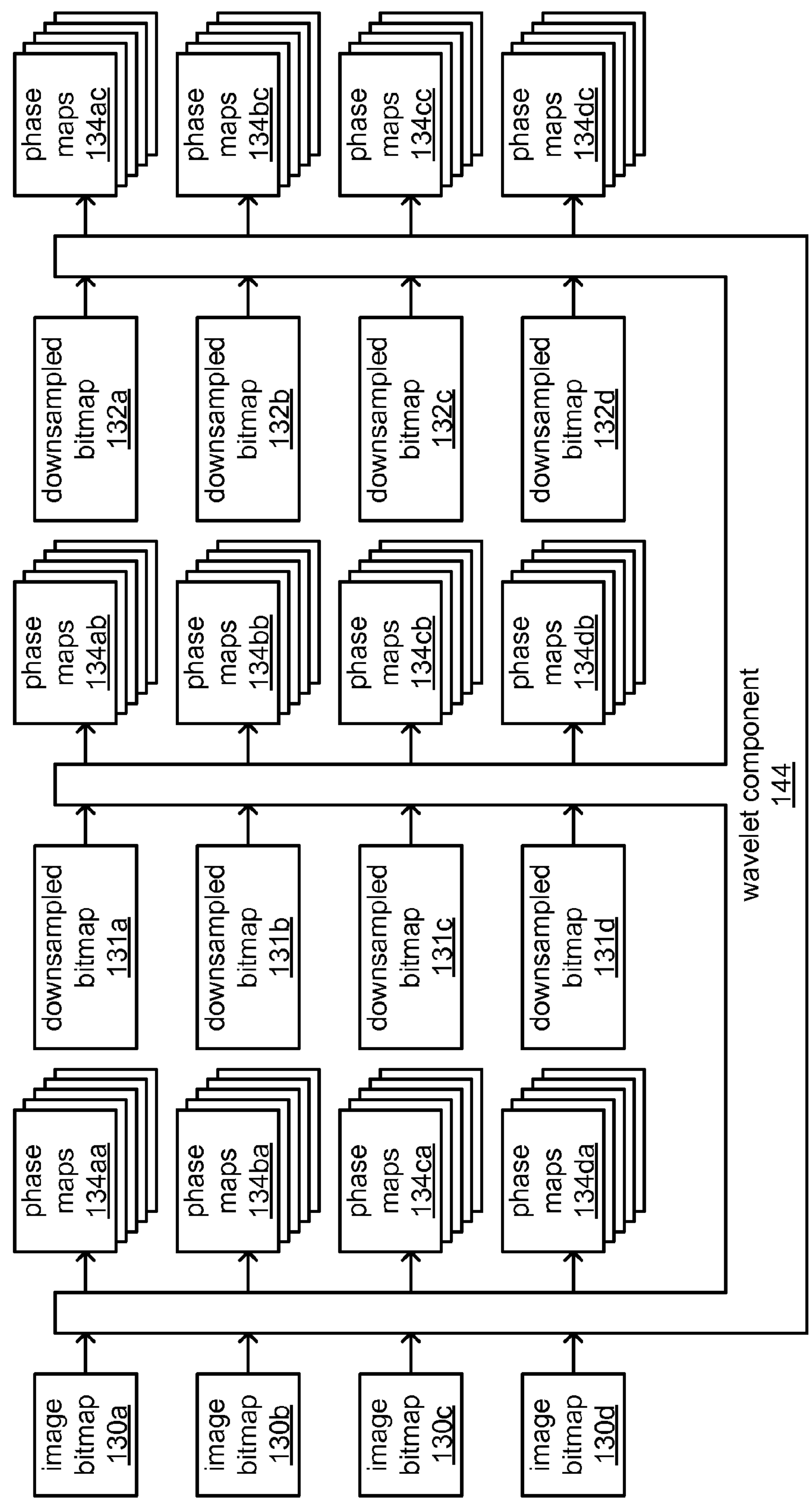
Figure 4B:
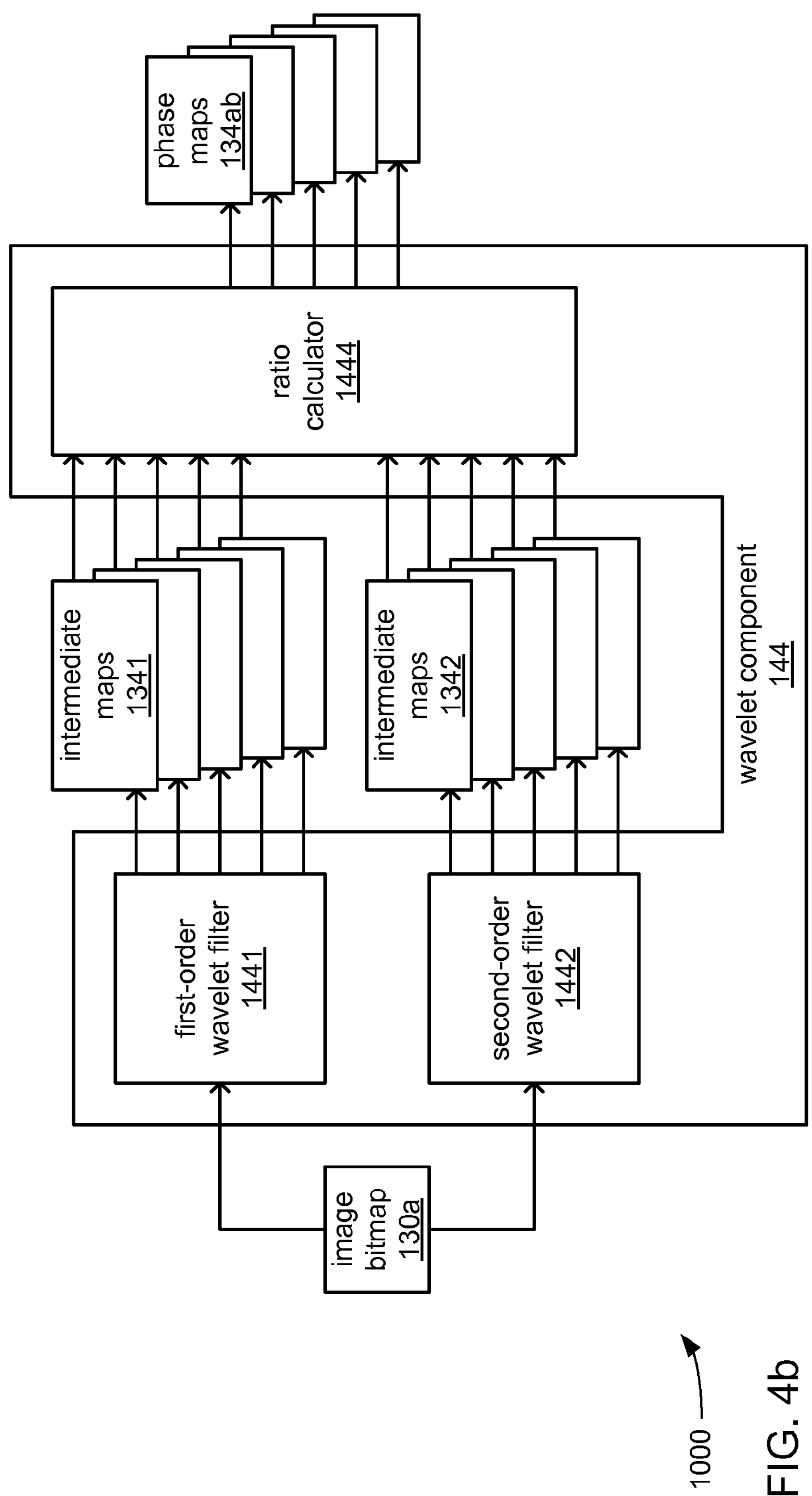
Figure 5:
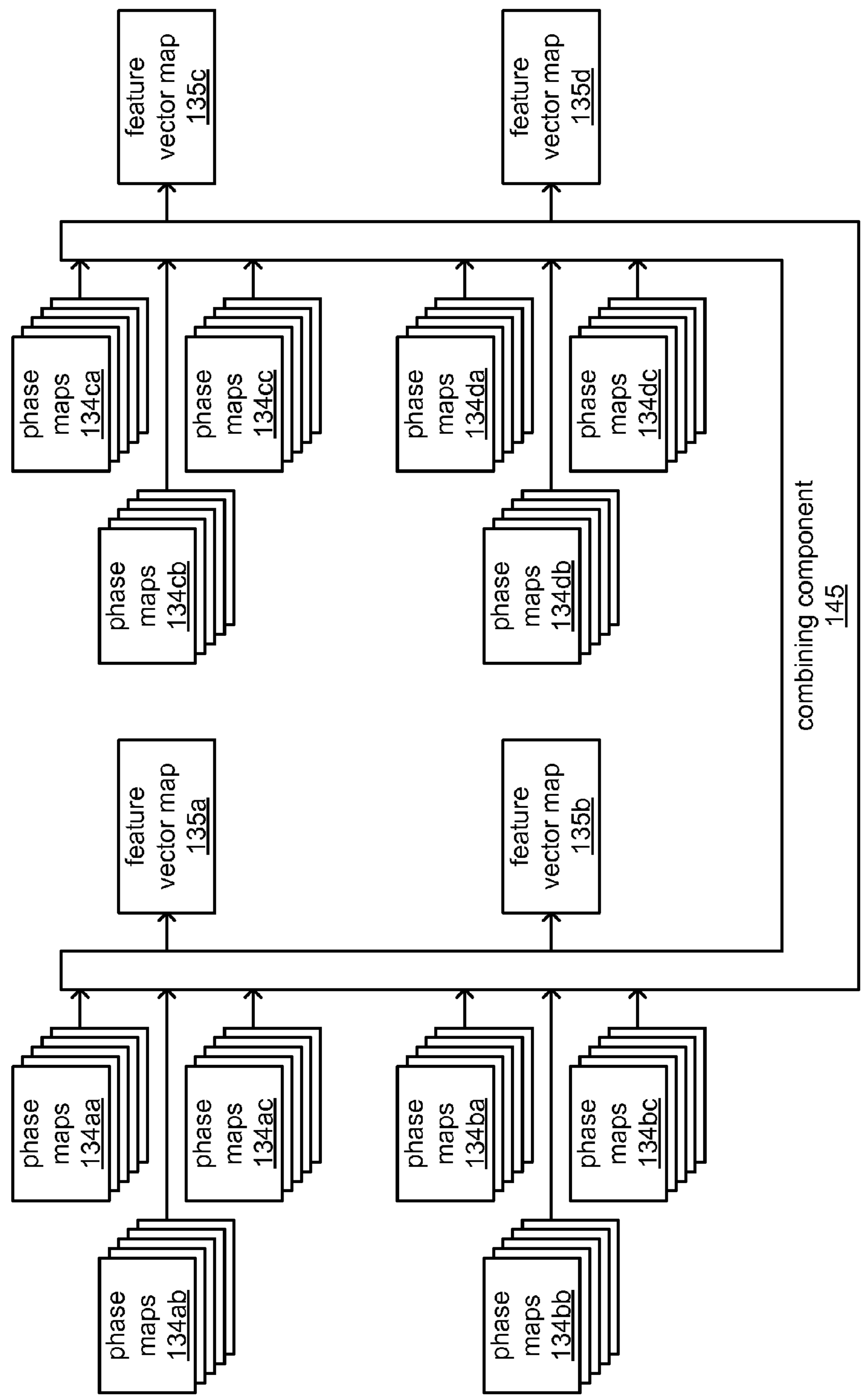
Figure 6:
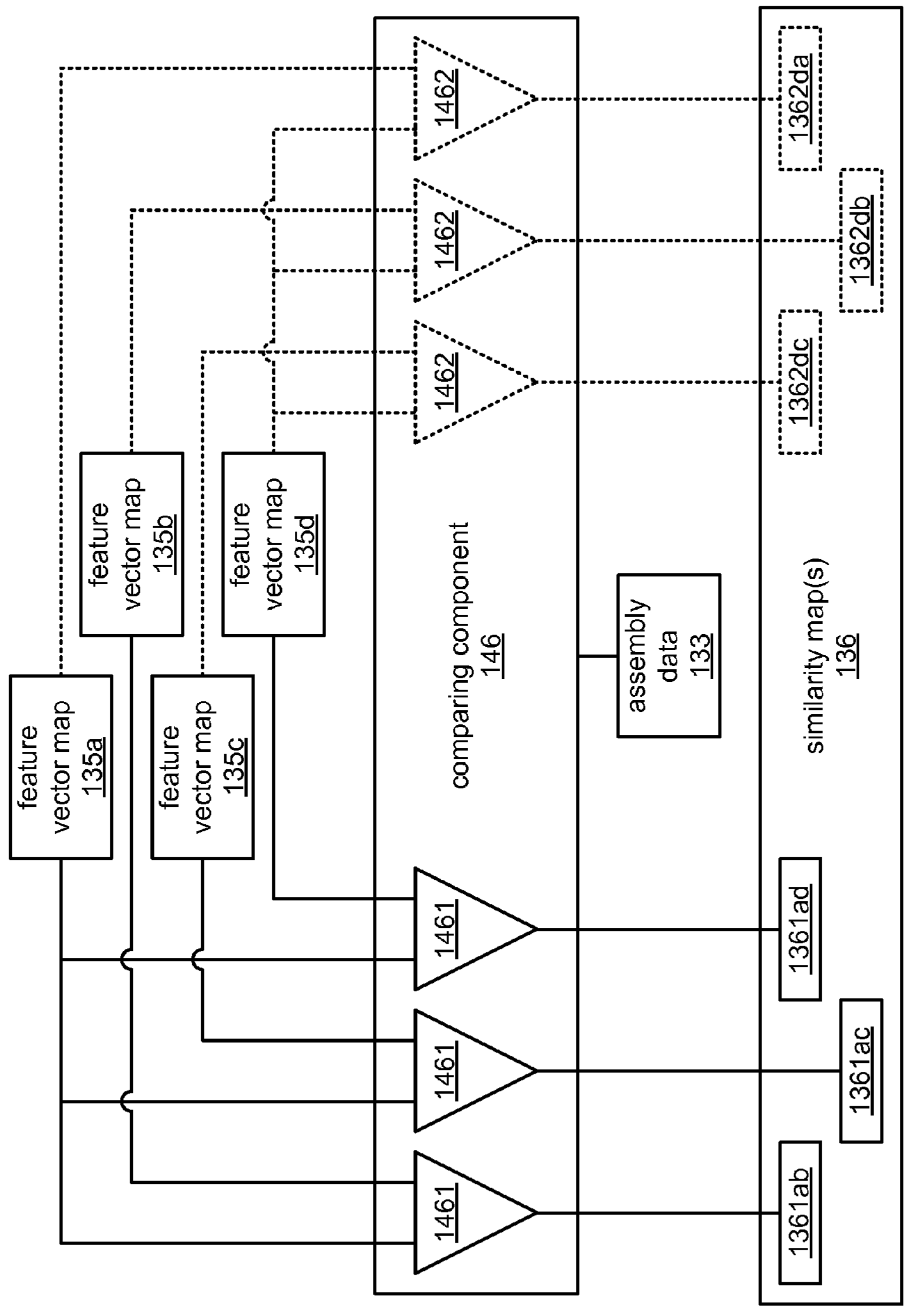

FIG. 4*b* provides further detail of the operation of the wavelet component 144 performing a portion of what is depicted in FIG. 4*a* in deriving the phase maps 134*ab* from the image bitmap 130*a*. As depicted, the wavelet component includes both a first-order wavelet filter 1441 and a second-order wavelet filter 1442. The image bitmap 130*a* is convolved using both of the first-order wavelet filter 1441 and the second-order wavelet filter 1442 multiple times, thereby creating multiple ones of intermediate maps 1341 and 1342, respectively. Each of the wavelet filters 1441 and 1442 transform the bitmap information of each pixel of the image bitmap 130*a* into the frequency domain, providing a scalar value for each pixel in each of these intermediate maps that indicates a distance from an edge in a given direction from that pixel, the given direction set by the orientation to which the first-order wavelet filter 1441 and the second-order wavelet filter 1442 have been set.

Each time the image bitmap 130*a* is subjected to these wavelet filters to create more of each of the intermediate maps 1341 and 1342, the orientations of these wavelet filters are changed to enable determination of the distance of each pixel from an edge in a different direction. The specific wavelet functions of these two wavelet filters and the orientations given to each of them may be chosen to be mathematically related such that the first-order wavelet filter 1441 approximates a "sine" function masked by a Gaussian and the second-order wavelet filter 1442 approximates a related "cosine" function masked by a Gaussian of the same phase in the frequency domain. For each orientation to which these two wavelet filters are set, the first-order wavelet filter 1441 provides a scalar value for each pixel indicating how far that pixel is from a "step" edge, and the second-order wavelet filter 1442 provides a scalar value for each pixel indicating how far that pixel is from a "bar" edge. Thus, each of the intermediate maps 1341 and 1342 are made up of scalar values indicative of distances to step and bar edges in various directions, respectively.

It should be noted that although FIG. 4*b* depicts subjecting the image bitmap 130*a* to both of these two wavelet filters five times (creating five each of the intermediate maps 1341 and 1342), each time with these two wavelet filters set to different orientations, other embodiments are possible in which each of the bitmaps 130*a-d* and the downsampled 131*a-d* and 132*a-d* are subjected to a greater or lesser number of times to these two wavelet filters. This is based entirely on the number of orientations selected for each of these two wavelet filters to use. A greater number of orientations may be deemed desirable where the captured images are expected to have greater complexity, and thus, more edges. A greater quantity of edges in an image likely requires more data points to describe effectively, likely requiring these two wavelet filters to be set to a greater number of orientations, resulting a greater quantity of intermediate maps (and a corresponding quantity of phase maps) for each image.

As also depicted, the wavelet component 144 also includes a ratio calculator 1444 to calculate ratios of the scalar values of each pixel in corresponding ones of the intermediate maps 1341 and 1342. In so doing, the ratio calculator creates phase maps made up of ratio values for each pixel indicative of distances to the nearest edge (of whatever type) in the various directions corresponding to the various orientations to which the first-order wavelet filter 1441 and the second-order wavelet filter 1442 were set (specifically, the phase maps 134*ab* corresponding to the image bitmap 130*a*). These ratio values are each a continuous measure of the proximity of an edge in which a value of zero indicates that the particular pixel overlies an edge, and a non-zero value is indicative of a relative distance to an edge.

Returning to FIG. 2, the control routine 140 includes a combining component 145 executable by the processor circuit 150 to combine the indications of distances to edges of each original pixel and coarser downsampled counterpart pixels into sets of feature vectors for each pixel within a feature vector map. In essence, the repeated splitting apart of information corresponding to each pixel of each of the image bitmaps 130*a-d* that was done via the pyramid image processing of the downsampling component 141 and the generation of multiple phase maps done via the wavelet filter component 144 is now reversed by the combining component 145 as all per-pixel data that has been derived and corresponds to a single one of the image bitmaps 130*a-d* is now reassembled into a single corresponding one of the feature vector maps 135*a-d*. Specifically, and turning momentarily to FIG. 5, all of the per-pixel values indicative of distances from edges in various directions in each of the phase maps 134*aa-ac* are combined into a list of feature vectors indicating distances and directions of edges for each pixel in the feature vector map 135*a*; such per-pixel information in each of the phase maps 134*ba-bc* are combined into such a list of vectors in the feature vector map 135*b*; such per-pixel information in each of the phase maps 134*ca-cc* are combined into such a list of vectors in the feature vector map 135*c*; and such per-pixel information in each of the phase maps 134*da-dc* are combined into such a list of vectors in the feature vector map 135*d*.

It should be noted that, since some of these phase maps were generated from downsampled bitmaps of the original captured images, each of their coarser pixels overlie multiple ones of the original captured image pixels. Thus, the feature vectors contributed by each of these coarser pixels will each be incorporated into all of the original-sized pixels that they overlie in the feature vector maps 135*a-d*.

Returning to FIG. 2, the control routine 140 includes a comparing component 146 executable by the processor circuit 150 to perform at least a first set of comparisons among the feature vector maps 135*a-d* to create a first set of similarity maps 1361*ab*, 1361*ac* and 1361*ad* making up the similarity maps 136. Specifically, and turning momentarily to FIG. 6, the feature vector map 135*a* is selected to be a first reference feature vector map against which each of the other feature vector maps 135*b-d* is compared in this first set of comparisons. In each of these comparisons, each pixel of the feature vector map 135*a* (the first reference) is compared to the pixel at the corresponding location and at neighboring locations in each of the feature vector maps 135*b-d*. The degree to which the feature vector values of each of those pixels at the corresponding and neighboring locations in each of the feature vector maps 135*b-d* are similar to the feature vector values of the pixel of the feature vector map 135*a* is stored as a set of similarity values in separate similarity maps that each correspond to one of the compared pairs of feature vector maps. Stated differently, the degree to which the feature vector values of a pixel of the feature vector map 135*a* (the first reference) are similar to the feature vector values of the pixel at the corresponding location and at the locations neighboring that corresponding location in the feature vector map 135*b* are stored as a set of similarity values for that pixel of the feature vector map 135*a* in the similarity map 1361*ab*. Similarity values from comparisons between the feature vector maps 135*a* and 135*c* are stored in the similarity map 1361*ac*, and similarity values from comparisons between the feature vector maps 135*a* and 135*d* are stored in the similarity map 1361*ad*. It may be that the comparing component 146 employs indications in the assembly data 133 of the relative positions of each of the cameras 110*a-d* to at least partly determine what neighboring pixel locations in each of the feature vector maps 135*b-d* to include in these comparisons to derive similarity values for inclusion in each of the similarity maps 1361*ab*, 1361*ac* and 1361*ad*.

Correspondingly, in embodiments in which a later consistency check is desired, the feature vector map 135*d* may be selected as a second reference feature vector map against which each of the others of the feature vector maps 135*a-c* is compared in an optional second set of comparisons (the optional nature of which is indicated via the use of dotted lines) creating a second set of similarity maps 1362*dc*, 1362*db* and 1362*da* making up more of the similarity map(s) 136. In each of these comparisons, the feature vector values of each pixel of the feature vector map 135*d* (the second reference) are compared to the feature vector values of the pixel at the corresponding location and at neighboring locations in each of the feature vector maps 135*a-c*. The degree to which the feature vector values of the pixels at those corresponding locations and at the neighboring locations in each of the feature vector maps 135*a-c* are similar to the feature vector values of each pixel of the feature vector map 135*d* is stored as sets of similarity values in separate similarity maps that correspond to each pair of compared feature vector maps. In other words, similarity values from comparisons between the feature vector maps 135*d* and 135*c* are stored in the similarity map 1362*dc*, similarity values from comparisons between the feature vector maps 135*d* and 135*b* are stored in the similarity map 1362*db*, and similarity values from comparisons between the feature vector maps 135*d* and 135*a* are stored in the similarity map 1362*da*.

It should be noted that although the comparing component 146 is depicted as including multiple comparators, three of comparators 1461 for performing each feature vector map comparison of the first set of comparisons and three comparators 1462 for performing each feature vector map comparison of the second set of comparisons, other embodiments are possible in which requisite comparison logic may be implemented in any of a number of ways. Indeed, a single pixel-by-pixel feature vector comparator may be implemented and iteratively used in some embodiments to compare corresponding feature vector values, one-by-one and pixel-by-pixel, while banks of comparators may be employed in other embodiments to achieve greater performance via some degree of parallelism.

Returning to FIG. 2, the control routine 140 includes a disparity component 147 executable by the processor circuit 150 to analyze at least the first set of similarity maps 1361*ab*, 1361*ac* and 1361*ad* of the similarity map(s) 136 to derive at least at a first disparity map 1371 of the disparity map(s) 137. More specifically, and turning momentarily to FIG. 7*a*, for each pixel of the feature vector map 135*a*, sets of similarity values associated with that pixel in each of these similarity maps are analyzed to identify what pixels in each of the feature vector maps 135*b-d* had feature vector values that were relatively similar to the feature vector values of that pixel of the feature vector map 135*a* and were also relatively close to that pixel of the feature vector map 135*a* such that the pattern of relative distances from that pixel of the feature vector map 135*a* are proportional to the relative distances of corresponding ones of the cameras 110*b-d* from the camera 110*a* as indicated in the assembly data 133.

Figure 3B:
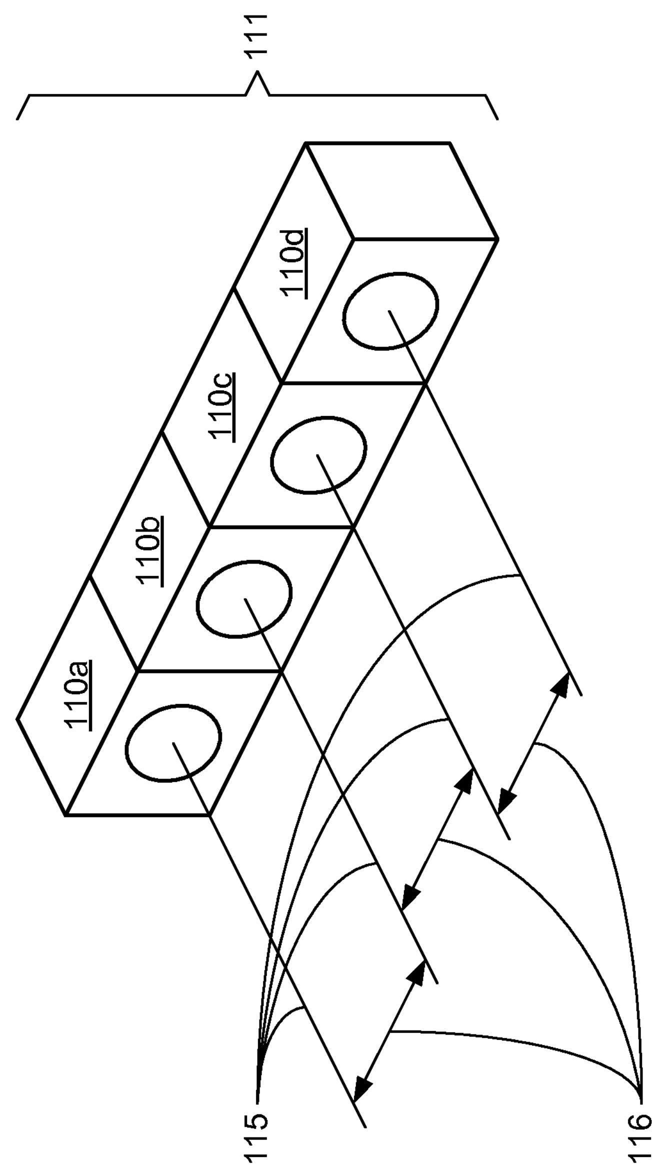

Turning momentarily to FIG. 3*b*, it can be seen that the relative positions of the cameras 110*a-d* are such that the camera 110*b* is the immediate neighbor of the camera 110*a*, with the camera 110*c* just beyond the camera 110*b* from the camera 110*a*, and with the camera 110*d* just beyond both of the cameras 110*b* and 110*c* from the camera 110*a*. As is also depicted in FIG. 3*b* the distances 116 between adjacent ones the optic centers 115 of each of the cameras 110*a-d* are equal. In the analysis performed by the disparity component 147, this information from the assembly data 133 leads to an expectation that distances (measured in pixels) between corresponding pixels of the feature vector maps 135*a* and 135*c* should generally be twice that of distances between corresponding pixels of the feature vector maps 135*a* and 135*b*, and similarly, distances between corresponding pixels of the feature vector maps 135*a* and 135*d* should generally be three times that of distances between corresponding pixels of the feature vectors maps 135*a* and 135*b*. In other words, the information on relative distances between the optic centers 115 of the cameras 110*a-d* in the assembly data 133 should indicate proportions of distances that should be reflected in the analysis of the first set of similarity maps.

Figure 7A:
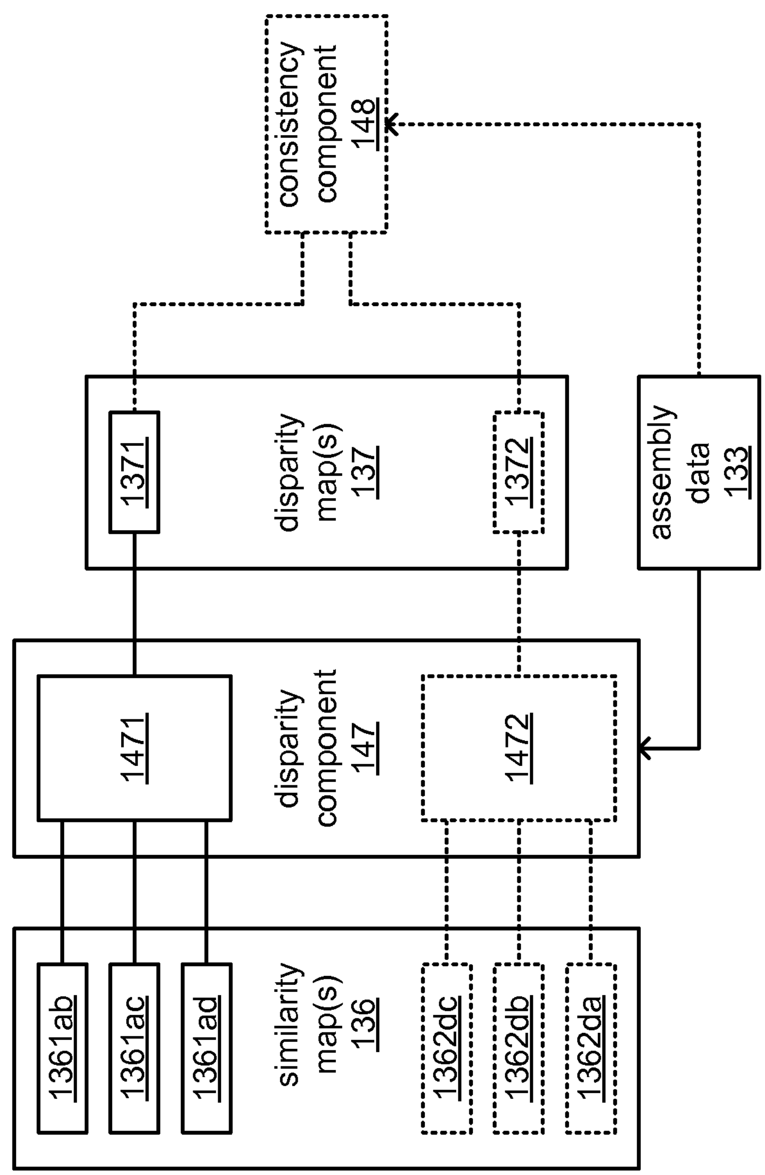
Figure 7B:
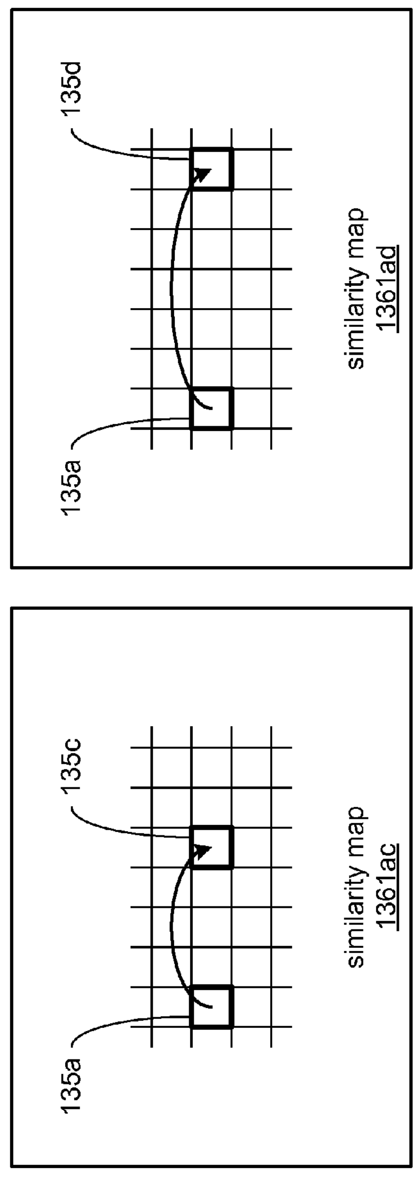
Figure 7B:
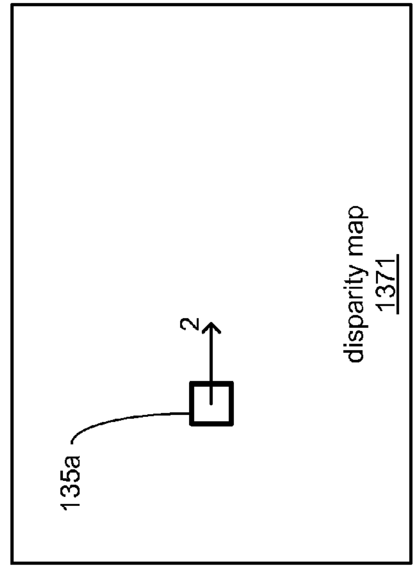
Figure 7B:
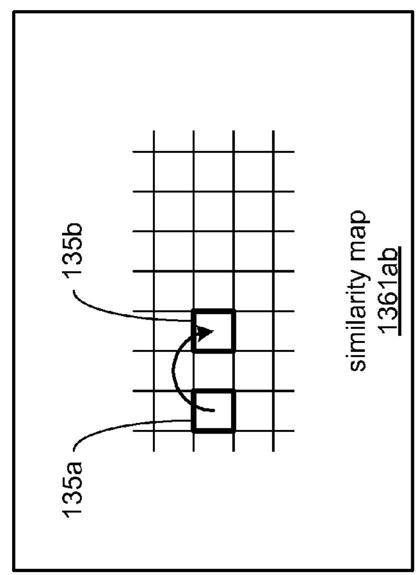

Turning momentarily to FIG. 7*b*, aspects are graphically depicted of the data stored in each of the similarity maps 1361*ab*, 1361*ac* and 1361*ad* that indicates the results of comparisons of feature vector values between a single pixel of the feature vector map 135*a* and pixels at both corresponding and neighboring locations in each of the feature vector maps 135*b-d*. First, as indicated in the data stored in the similarity map 1361*ab*, from the location of the pixel of the feature vector map 135*a* there appears to be a pixel two pixels away in the feature vector map 135*b* that may correspond to the pixel of the feature vector map 135*a*. This pixel at two pixels away in the feature vector map 135*b* is found to have feature vector values that are relatively similar to those of the pixel of the feature vector map 135*a*. Second, as indicated in the data stored in the similarity map 1361*ac*, from the location of the pixel of the feature vector map 135*a* there appears to be a pixel four pixels away in the feature vector map 135*c* that may correspond to the pixel of the feature vector map 135*a*. This pixel at four pixels away in the feature vector map 135*c* is found to have feature vector values that are relatively similar to those of the pixel of the feature vector map 135*a*. Further, the relative distances (as measured in pixels) between the location of the pixel of the feature vector map 135*a* and the locations of each of these possible corresponding pixels of in feature vector maps 135*b* and 135*c* have the same relative proportions as the distances between the optic center 115 of the camera 110*a* and the optic centers 115 of each of the cameras 110*b* and 110*c*, respectively. In this analysis performed by the disparity component 147, this correspondence of proportions of distances is taken as tending to confirm that these two pixels in the feature vector maps 135*b* and 135*c* must correspond to the pixel of the feature vector map 135*a*.

Still, further, as indicated in the data stored in the similarity map 1361*ad*, from the location of the pixel of the feature vector map 135*a* there appears to be a pixel six pixels away in the feature vector map 135*d* that may correspond to the pixel of the feature vector map 135*a*. This pixel at six pixels away in the feature vector map 135*d* is found to have feature vector values that are relatively similar to those of the pixel of the feature vector map 135*a*. Yet further, the relative proportion of the distance between the location of the pixel of the feature vector map 135*a* and the location of this possible corresponding pixel in the feature vector map 135*d* also fits the relative proportions of the distance between the optic center 115 of the camera 110*a* and the optic center 115 of the camera 110*d*, taken in conjunction with the other aforementioned distances between optic centers. Thus, further confirmation is provided that enables the determination that these pixels at two, four and six pixels away in the feature vector maps 135*b*, 135*c* and 135*d*, respectively, from the location of the pixel of the feature vector map 135*a* are, indeed, the pixels that correspond to the pixel of the feature vector map 135*a*.

With this determination made, the disparity component 147 derives the disparity value in the disparity map 1371 that corresponds to the pixel of the feature vector map 135*a* to be two, as this is the distance in pixels from the location of the pixel of the feature vector map 135*a* to its closest corresponding pixel, namely its corresponding pixel in the feature vector map 135*b*. This same analysis of the similarity maps 1361*ab*, 1361*ac* and 1361*ad* is repeated for each pixel of the feature vector map 135*a* to identify corresponding pixels in each of the feature vector maps 135*b-d*, and therefrom (taking into account proportions in distances as indicated by the assembly data 133), deriving disparity values with which to create the disparity map 1371 for each of those pixels of the feature vector map 135*a*.

Turning again to FIG. 7*a*, in embodiments in which a disparity map consistency check is desired and where the second set of similarity maps of the similarity map(s) 136 have been created by the comparison component 146, the disparity component 147 is also executable by the processor circuit 150 to subject that second set of similarity maps (namely, the similarity maps 1362*dc*, 1362*db* and 1362*da*) to the same analysis to derive a second disparity map of the disparity map(s) 137 (namely, the disparity map 1372). In embodiments where a disparity map consistency check is desired, the control routine 140 may include a consistency component 148 executable by the processor circuit 150 to subject the first and second final disparity maps 1371 and 1372 stored as the disparity map(s) 137 to a comparison of their disparity values, taking into account the relative proportions of distances between the optic centers of the cameras 110*a-d*, as indicated in the assembly data 133. Where consistency meeting a selected threshold is found between the two disparity maps 1371 and 1372, either disparity map may then be used as the final disparity map to be provided as in input to whatever other computer vision or image processing functions are to be performed.

In providing a final disparity map (regardless of whether a consistency checks is perform) for further computer vision or image processing functions, such further processing functions may be performed by the processor circuit 150 and may culminate in the processor circuit 150 causing a three-dimensional image (or portions thereof) to be visually presented on the display 180, in some embodiments. Alternatively or additionally in other embodiments, the processor circuit 150 may be caused to operate the interface 190 to transmit data representing imagery derived (at least in part) from the final disparity map to another computing device (not shown) via a network (not shown), either in lieu of or in addition to transmitting the final disparity map itself via that network.

Figure 8:
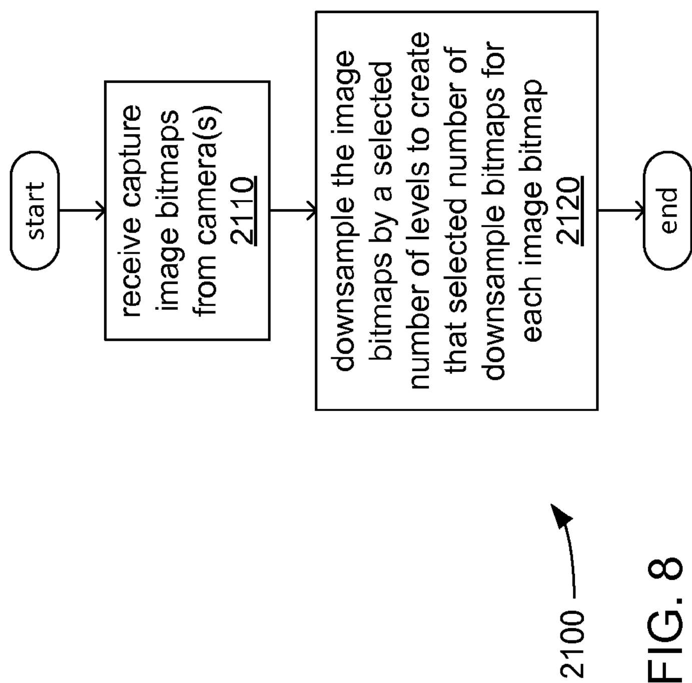
FIG. 8 illustrates an embodiment of a first logic flow.

FIG. 8 illustrates an embodiment of a logic flow 2100. The logic flow 2100 may be representative of some or all of the operations executed by one or more embodiments described herein. More specifically, the logic flow 2100 may illustrate operations performed by at least the processor circuit 150 of the computing device 1000 in executing at least the control routine 140.

At 2110, a computing device (e.g., the computing device 1000) receives multiple captured image bitmaps from either a single camera employed to capture the multiple image bitmaps over time or multiple cameras employed to capture the multiple images substantially simultaneously (e.g., the cameras 110*a-x*). As previously discussed, where multiple cameras are employed in capturing the multiple captured image bitmaps, those cameras may be arranged in any of a variety of ways including any of a number of arrangements of camera array.

At 2120, the computing device downsamples each of the captured image bitmaps (e.g., the image bitmaps 130*a-x*) to a selected number of levels of pyramid image processing to create that selected number of levels of downsampled bitmaps (e.g., the two levels of downsampled bitmaps 131*a-x*, 132*a-x* depicted in examples herein). As previously discussed, the number of levels selected is at least partially dependent on the resolution and/or expected complexity of the captured image bitmaps.

Figure 9:
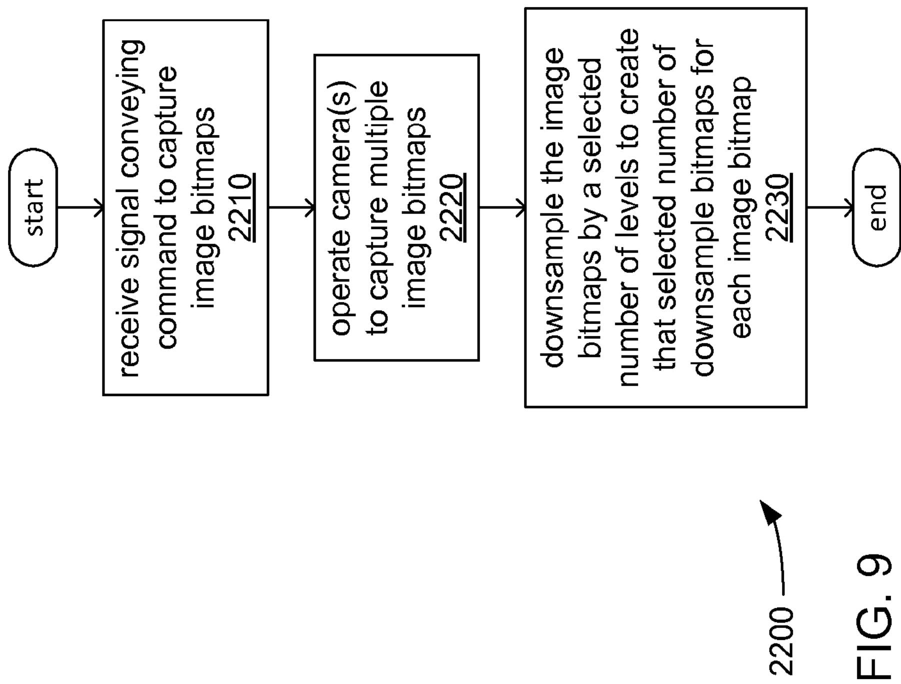
FIG. 9 illustrates an embodiment of a second logic flow.

FIG. 9 illustrates an embodiment of a logic flow 2200. The logic flow 2200 may be representative of some or all of the operations executed by one or more embodiments described herein. More specifically, the logic flow 2200 may illustrate operations performed by at least the processor circuit 150 of the computing device 1000 in executing at least the control routine 140.

At 2210, a computing device (e.g., the computing device 1000) receives a signal conveying a command to the computing device to capture multiple image bitmaps, all of a single common scene. As previously discussed, either a single camera operated to capture each of the multiple image bitmaps over time or multiple cameras operated to capture the multiple image bitmaps substantially simultaneously may be used (e.g., the cameras 110*a-x*).

At 2220, the computing device operates the camera(s) to capture the multiple image bitmaps. As previously discussed, where multiple cameras are employed in capturing the multiple captured image bitmaps, those cameras may be arranged in any of a variety of ways including any of a number of arrangements of camera array.

At 2230, the computing device downsamples each of the captured image bitmaps (e.g., the image bitmaps 130*a-x*) to a selected number of levels of pyramid image processing to create that selected number of levels of downsampled bitmaps (e.g., the two levels of downsampled bitmaps 131*a-x*, 132*a-x* depicted in examples herein). Again, the number of levels selected is at least partially dependent on the resolution and/or expected complexity of the captured image bitmaps.

Figure 10:
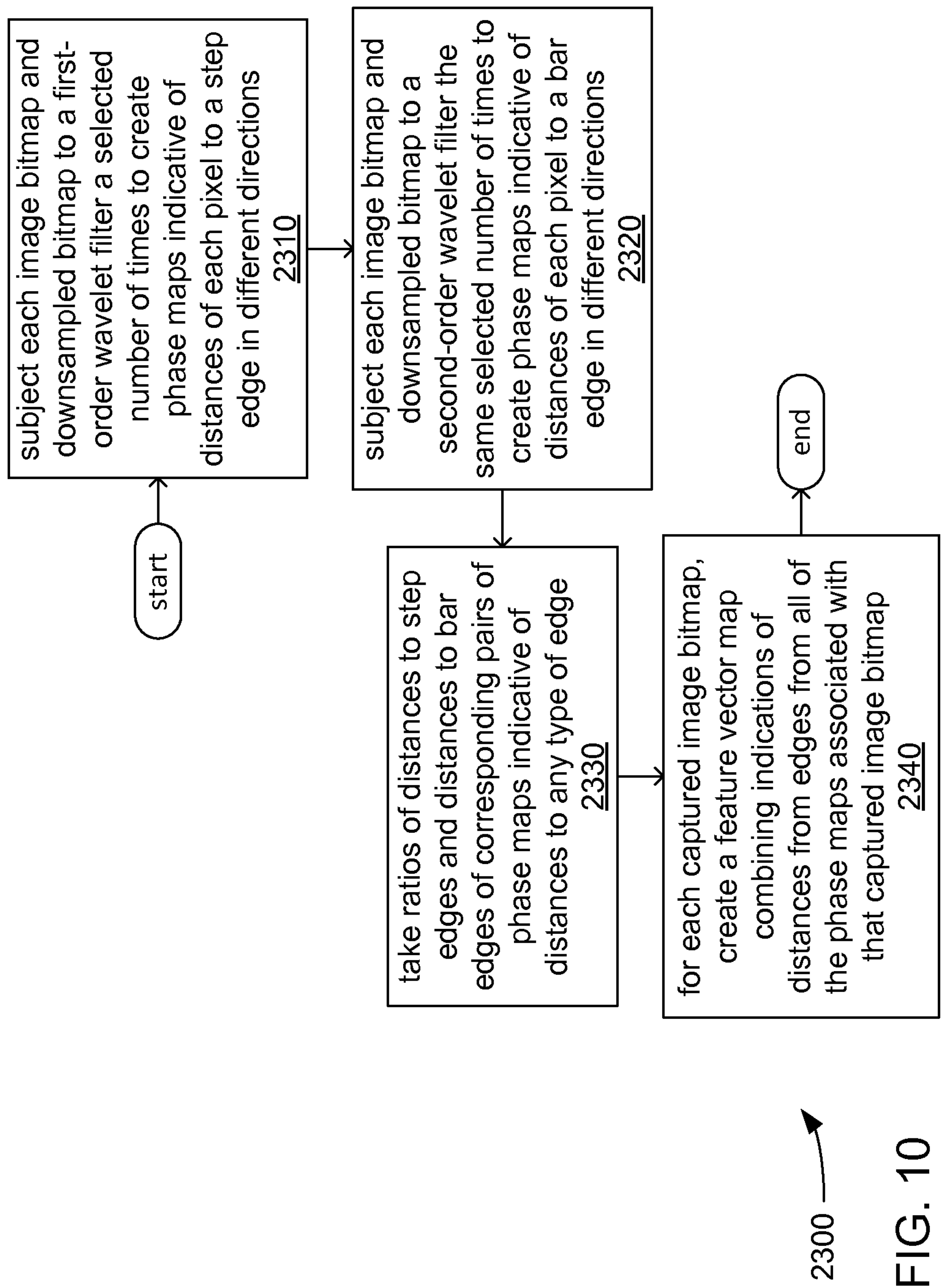
FIG. 10 illustrates an embodiment of a third logic flow.

FIG. 10 illustrates an embodiment of a logic flow 2300. The logic flow 2300 may be representative of some or all of the operations executed by one or more embodiments described herein. More specifically, the logic flow 2300 may illustrate operations performed by at least the processor circuit 150 of the computing device 1000 in executing at least the control routine 140.

At 2310, a computing device (e.g., the computing device 1000) implements a first-order wavelet filter (e.g., the first-order wavelet filter 1441), and subjects each image bitmap and downsampled bitmap to the first-order wavelet filter multiple times, with the first-order wavelet filter set to different selected orientation each time, to create intermediate maps indicative of distances of each pixel to a step edge in different directions corresponding to the different orientations (e.g., the intermediate maps 1341). At 2320, the computing device implements a second-order wavelet filter (e.g., the second-order wavelet filter 1442), and subjects each of the same image bitmaps and downsampled bitmaps to the second-order wavelet filter multiple times, with the second-order wavelet filter set to different selected orientation each time, to create intermediate maps indicative of distances of each pixel to a bar edge in different directions corresponding to the different orientations (e.g., the intermediate maps 1342). As has been discussed, the wavelet transforms implemented by each of the first-order and second-order filters, as well as the multiple orientations to which each is set, may be selected to be mathematically related such that the first-order wavelet filter approximates a "sine" function masked by a Gaussian and the second-order wavelet filter approximates a related "cosine" function also masked by a Gaussian.

At 2330, pixel-by-pixel ratios are taken from corresponding ones of the intermediate maps generated by the first-order and second-order filters to create phase maps that include the ratios for each pixel (e.g., the phase maps 134*aa-xy*). As previously discussed, the ratios are indicative of distances from each pixel to any form of edge.

At 2340, for each of the originally captured image bitmaps, all of the phase maps created therefrom and from their down-sampled bitmaps are combined into a single feature vector map made up of a list of feature vectors indicative of the ratios and associated directions for each pixel (e.g., the feature vector maps 135*a-x*). As has been discussed, the creation of these feature vector maps is the reversal of the repeated splitting apart of data derived from each of the originally captured image bitmaps—the result is a one-to-one correspondence of image bitmaps to feature vector maps.

Figure 11:
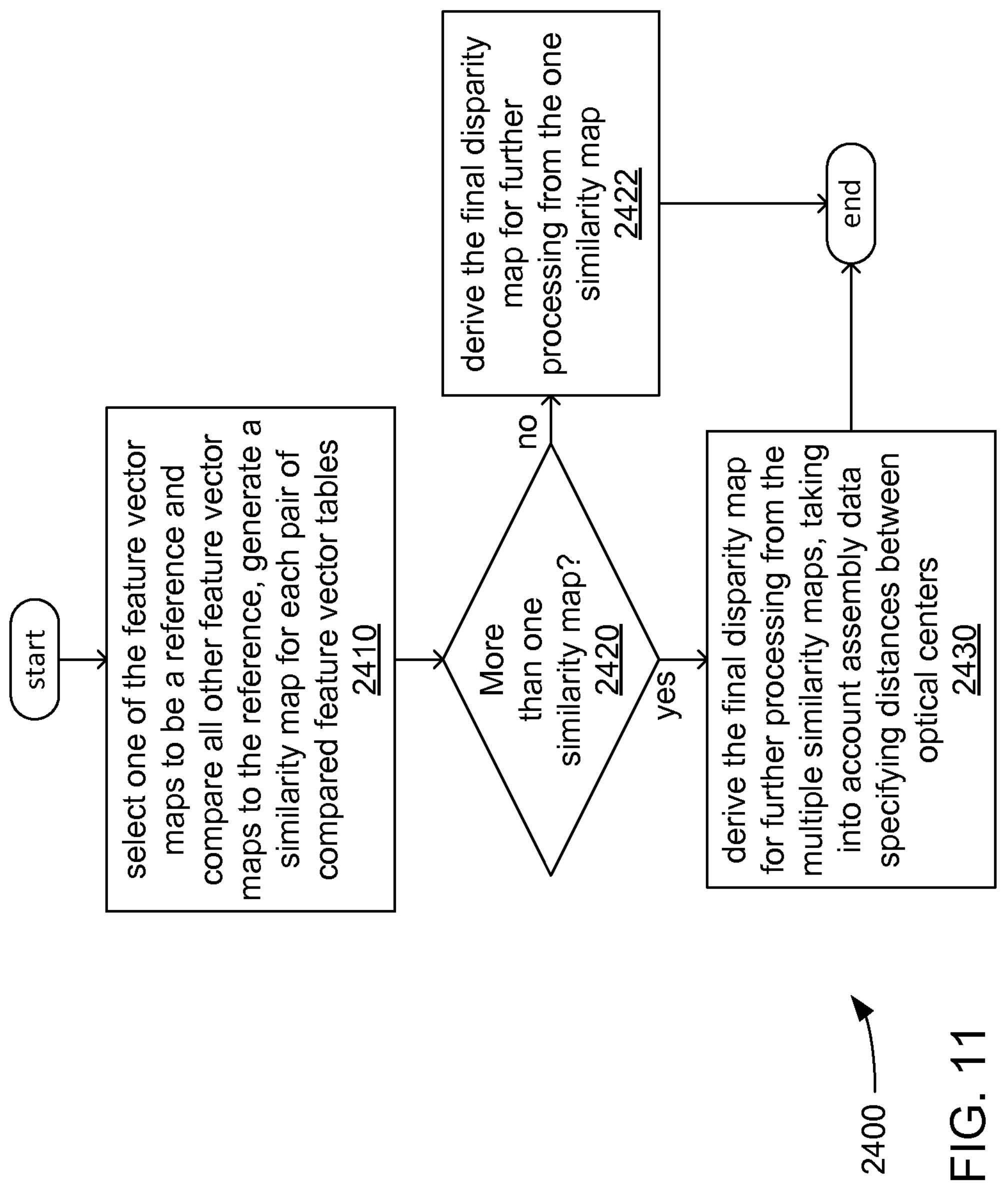
FIG. 11 illustrates an embodiment of a fourth logic flow.

FIG. 11 illustrates an embodiment of a logic flow 2400. The logic flow 2400 may be representative of some or all of the operations executed by one or more embodiments described herein. More specifically, the logic flow 2400 may illustrate operations performed by at least the processor circuit 150 of the computing device 1000 in executing at least the control routine 140.

At 2410, a computing device (e.g., the computing device 1000) selects a feature vector map of multiple feature vector maps (e.g., the feature vector maps 135*a-x*) that have been created by combining multiple phase maps to be a reference. The computing device then compares all others of the multiple feature vector maps to that reference, creating one or more similarity maps (e.g., the similarity map(s) 136) depending on the number of feature vector maps. As has been described, each of the similarity maps is made up of sets of similarity values from comparisons of pixels of the reference to pixels at the corresponding and neighboring locations in each of the other feature vector maps.

At 2420, a check is made as to whether there is more than one similarity map. If not, as would be the case where there were originally only two captured image bitmaps, then the one similarity map is used to derive the final disparity map for use in further computer vision or image processing at 2422. As has been discussed, such further processing may be performed by this same computing device, possibly culminating in the computing device visually presenting possibly a three-dimension image derived from the final disparity map, or may be performed by another computing device to which this computing device transmits the final disparity map (or other data derived therefrom) via a network.

However, if there is more than one similarity map, then at 2430, the computing device analyzes each of the similarity maps to locate corresponding pixels located at distances proportional to distance between optical centers of the cameras used to capture the image bitmaps from the locations of pixels of the reference to derive the final disparity map. As has been described, an assembly data describing such aspects of relative placement of multiple cameras or relative positions of vantage points used by one camera.

Figure 12:
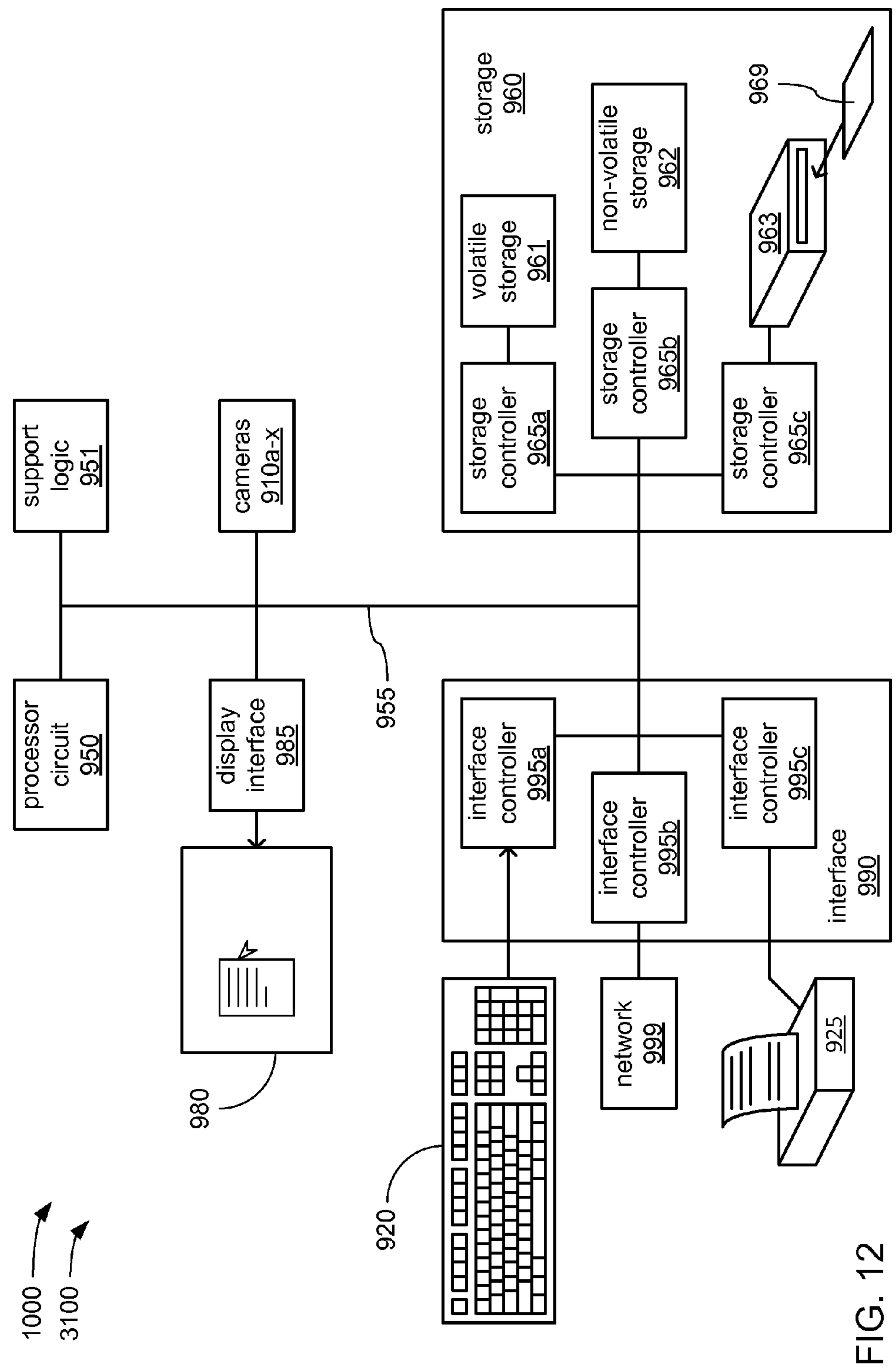
FIG. 12 illustrates an embodiment of a processing architecture.

FIG. 12 illustrates an embodiment of an exemplary processing architecture 3100 suitable for implementing various embodiments as previously described. More specifically, the processing architecture 3100 (or variants thereof) may be implemented as part of the computing device 1000. It should be noted that components of the processing architecture 3100 are given reference numbers in which the last two digits correspond to the last two digits of reference numbers of components earlier depicted and described as part of the computing device 1000. This is done as an aid to correlating such components of the computing device 1000 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3100, a computing device incorporates at least a processor circuit 950, support logic 951, a storage 960, a controller 900, an interface 990 to other devices, and coupling 955. As will be explained, depending on various aspects of a computing device implementing the processing architecture 3100, including its intended use and/or conditions of use, such a computing device may further include additional components, such as without limitation, a display interface 985 and/or one or more cameras 910.

Coupling 955 is made up of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990, the audio subsystem 970 and the display interface 985 (depending on which of these and/or other components are also present). With the processor circuit 950 being so coupled by couplings 955, the processor circuit 950 is able to perform the various ones of the tasks described at length, above, for whichever ones of the computing device 1000 and the controller 200 implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to the processor circuit 150) may include any of a wide variety of commercially available processors, employing any of a wide variety of technologies and implemented with one or more cores physically combined in any of a number of ways.

As previously discussed, the storage 960 (corresponding to the storage 160) may include one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller **965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965*b* providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969 (possibly corresponding to the storage medium 169), the removable media storage 963 may be communicatively coupled to coupling 955 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable storage medium 969**.

One or the other of the volatile storage 961 or the non-volatile storage 962 may include an article of manufacture in the form of a machine-readable storage media on which a routine including a sequence of instructions executable by the processor circuit 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may include banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor circuit 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor circuit 950 as that routine is executed.

As previously discussed, the interface 990 (possibly corresponding to the interface 190) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers **995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless signaling, timings and/or protocols to access other computing devices through the depicted network 999 (perhaps a network made up of one or more links, smaller networks, or perhaps the Internet). The interface 995*c* may employ any of a variety of electrically conductive cabling enabling the use of either serial or parallel signal transmission to convey data to the depicted printer 925. Other examples of devices that may be communicatively coupled through one or more interface controllers of the interface 990** include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually includes) a display (e.g., the depicted example display 980, corresponding to the display 180), such a computing device implementing the processing architecture 3100 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Where a computing device implementing the processing architecture 9100 includes the cameras 910 (corresponding to the cameras 110*a-x*), each of the cameras 910 may be based on any of a variety of image capture technologies, including and not limited to semiconductor-based image sensors such as charge-coupled devices (CCD), etc. As has bee previously discussed, the cameras 910 may be arranged into any of a variety of arrays of cameras all to capture images of substantially the same scene at substantially the same time.

More generally, the various elements of the computing device 1000 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of a device includes a processor circuit, and a storage communicatively coupled to the processor circuit to store instructions. When executed by the processor circuit the instructions cause the processor circuit to implement a first-order wavelet filter and a second-order wavelet filter; subject a first image bitmap captured of a scene to the first-order wavelet filter a selected number of times, an orientation of the first-order wavelet filter altered each time to create an intermediate map of a first set of intermediate maps; and subject the first image bitmap to the second-order wavelet filter the selected number of times, an orientation of the second-order wavelet filter altered each time to create an intermediate map of a second set of intermediate maps.

The above example of a device in which the first-order wavelet filter and the second-order wavelet filter selected to be mathematically related, and the orientations of the first-order wavelet filter and the second-order wavelet filter selected to be mathematically related such that the first-order wavelet filter approximates a sine function and the second-order wavelet filter approximates a related cosine function.

Either of the above examples of a device in which the device includes a camera, and the processor circuit to operate the camera to capture the first image bitmap.

Any of the above examples of a device in which the processor circuit is to receive signals from a camera conveying the first image bitmap.

Any of the above examples of a device in which in which the processor circuit is to downsample the first image bitmap a selected number of levels to create at least a first downsampled bitmap.

Any of the above examples of a device in which the processor circuit is to subject the first downsampled bitmap to the first-order wavelet filter the selected number of times, the orientation of the first-order wavelet filter altered each time to create another intermediate map of the first set of intermediate maps, and subject the first downsampled bitmap to the second-order wavelet filter the selected number of times, the orientation of the second-order wavelet filter altered each time to create another intermediate map of the second set of intermediate maps.

Any of the above examples of a device in which the processor circuit is to create one of a first set of phase maps including per-pixel ratios of values of corresponding pixels of one of the first set of intermediate maps and values of corresponding pixels of one of the second set of intermediate maps, each ratio indicative of a distance of a pixel from an edge in the first image bitmap.

Any of the above examples of a device in which the processor circuit is to create a first feature vector map including per-pixel indications of distances of each pixel from multiple lines in the first image bitmap indicated by values of corresponding pixels of each phase map of the first set of phase maps, and create a second feature vector map including per-pixel indications of distances of each pixel from multiple lines in a second image bitmap of the scene indicated by values of corresponding pixels of each phase map of a second set of phase maps corresponding to the second image bitmap.

Any of the above examples of a device in which the processor circuit is to compare feature vector values of a pixel of the first feature vector map to feature vector values of pixels at the corresponding location and multiple locations neighboring the corresponding location in the second feature vector map to derive similarity values indicative of degree of similarity in feature vector values found in each comparison, create a similarity map including the similarity values, analyze the similarity values to determine the distance from the location of the pixel of the first feature vector map to a corresponding pixel in the second feature vector map among the pixels at the corresponding location and multiple neighboring locations in the second feature vector map, derive a disparity value from the distance, and create a disparity map including the disparity value.

Any of the above examples of a device in which the processor circuit is to employ the disparity map to extract visual information from at least the first image bitmap in support of at least one of stereo depth estimation between two objects depicted in the first image bitmap, estimation of a distance of an object in the first image bitmap from a vantage point of a camera used to capture the first image bitmap, stabilization of capture of at least the first image bitmap, three-dimensional modeling of an object depicted in the first image bitmap, decode of a gesture of a human depicted in the first image bitmap, and visual display of at least one or more images based at least in part on the disparity map.

An example of another device includes a first camera to capture a first image bitmap of a scene, a second camera to capture a second image bitmap of the scene, a processor circuit, and a storage communicatively coupled to the processor circuit to store instructions. When executed by the processor circuit the instructions cause the processor circuit to operate the first and second cameras substantially simultaneously to capture the first and second image bitmaps; downsample the first image bitmap a selected number of levels to create at least one downsampled bitmap; subject the first image bitmap to a first-order wavelet filter a selected number of times, an orientation of the first-order wavelet filter altered each time to create an intermediate map of a first set of intermediate maps; and subject the first image bitmap to a second-order wavelet filter the selected number of times, an orientation of the second-order wavelet filter altered each time to create an intermediate map of a second set of intermediate maps, the first-order wavelet filter and the second-order wavelet filter selected to be mathematically related, and the orientations of the first-order wavelet filter and the second-order wavelet filter selected to be mathematically related such that the first-order wavelet filter approximates a sine function and the second-order wavelet filter approximates a related cosine function.

The above example of another device in which the processor circuit is to create one of a first set of phase maps including per-pixel ratios of values of corresponding pixels of one of the first set of intermediate maps and values of corresponding pixels of one of the second set of intermediate maps, each ratio indicative of a distance of a pixel from an edge in the first image bitmap.

Either of the above examples of another device in which the processor circuit is to create a first feature vector map including per-pixel indications of distances of each pixel from multiple lines in the first image bitmap indicated by values of corresponding pixels of each phase map of the first set of phase maps, and create a second feature vector map including per-pixel indications of distances of each pixel from multiple lines in the second image bitmap indicated by values of corresponding pixels of each phase map of a second set of phase maps corresponding to the second image bitmap.

Any of the above examples of another device in which the processor circuit to compare feature vector values of a pixel of the first feature vector map to feature vector values of pixels at the corresponding location and multiple locations neighboring the corresponding location in the second feature vector map to derive similarity values indicative of degree of similarity in feature vector values found in each comparison; create a similarity map including the similarity values; analyze the similarity values to determine the distance from the location of the pixel of the first feature vector map to a corresponding pixel in the second feature vector map among the pixels at the corresponding location and multiple neighboring locations in the second feature vector map; derive a disparity value from the distance; and create a disparity map including the disparity value.

Any of the above examples of another device in which device includes a display, and the processor circuit is to employ the disparity map to derive a three-dimensional model of an object of the scene and visually present a portion of the three-dimensional model on the display.

Any of the above examples of another device in which the processor circuit is to employ the disparity map to extract visual information from at least the first image bitmap in support of at least one of stereo depth estimation between two objects depicted in the first image bitmap, estimation of a distance of an object in the first image bitmap from a vantage point of a camera used to capture the first image bitmap, stabilization of capture of at least the first image bitmap, three-dimensional modeling of an object depicted in the first image bitmap, decode of a gesture of a human depicted in the first image bitmap, and visual display of at least one or more images based at least in part on the disparity map.

An example of a computer-implemented method includes receiving signals conveying a first image bitmap captured of a scene; receiving signals conveying a second image bitmap captured of the scene; subjecting the first image bitmap to a first-order wavelet filter a selected number of times, an orientation of the first-order wavelet filter altered each time to create an intermediate map of a first set of intermediate maps;

and subjecting the first image bitmap to a second-order wavelet filter the selected number of times, an orientation of the second-order wavelet filter altered each time to create an intermediate map of a second set of intermediate maps, the first-order wavelet filter and the second-order wavelet filter selected to be mathematically related, and the orientations of the first-order wavelet filter and the second-order wavelet filter selected to be mathematically related such that the first-order wavelet filter approximates a sine function and the second-order wavelet filter approximates a related cosine function.

The above example of a computer-implemented method in which the method includes downsampling the first image bitmap a selected number of levels to create at least a first downsampled bitmap.

Either of the above examples of a computer-implemented method in which the method includes subjecting the first downsampled bitmap to the first-order wavelet filter the selected number of times, the orientation of the first-order wavelet filter altered each time to create another intermediate map of the first set of intermediate maps; and subjecting the first downsampled bitmap to the second-order wavelet filter the selected number of times, the orientation of the second-order wavelet filter altered each time to create another intermediate map of the second set of intermediate maps.

Any of the above examples of a computer-implemented method in which the method includes creating one of a first set of phase maps including per-pixel ratios of values of corresponding pixels of one of the first set of intermediate maps and values of corresponding pixels of one of the second set of intermediate maps, each ratio indicative of a distance of a pixel from an edge in the first image bitmap.

Any of the above examples of a computer-implemented method in which the method includes creating a first feature vector map including per-pixel indications of distances of each pixel from multiple lines in the first image bitmap indicated by values of corresponding pixels of each phase map of the first set of phase maps; and creating a second feature vector map including per-pixel indications of distances of each pixel from multiple lines in a second image bitmap indicated by values of corresponding pixels of each phase map of a second set of phase maps corresponding to the second image bitmap.

Any of the above examples of a computer-implemented method in which the method includes employing the disparity map to extract visual information from at least the first image bitmap in support of at least one of stereo depth estimation between two objects depicted in the first image bitmap, estimation of a distance of an object in the first image bitmap from a vantage point of a camera used to capture the first image bitmap, stabilization of capture of at least the first image bitmap, three-dimensional modeling of an object depicted in the first image bitmap, decode of a gesture of a human depicted in the first image bitmap, and visual display of at least one or more images based at least in part on the disparity map.

An example of at least one machine-readable storage medium includes instructions that when executed by a computing device, cause the computing device to operate first and second cameras substantially simultaneously to capture first and second image bitmaps of a common scene; downsample the first image bitmap a selected number of levels to create at least one downsampled bitmap; subject the first image bitmap to a first-order wavelet filter a selected number of times, an orientation of the first-order wavelet filter altered each time to create an intermediate map of a first set of intermediate maps; and subject the first image bitmap to a second-order wavelet filter the selected number of times, an orientation of the second-order wavelet filter altered each time to create an intermediate map of a second set of intermediate maps, the first-order wavelet filter and the second-order wavelet filter selected to be mathematically related, and the orientations of the first-order wavelet filter and the second-order wavelet filter selected to be mathematically related such that the first-order wavelet filter approximates a sine function and the second-order wavelet filter approximates a related cosine function.

The above example of at least one machine-readable storage medium in which the computing device is caused to create one of a first set of phase maps including per-pixel ratios of values of corresponding pixels of one of the first set of intermediate maps and values of corresponding pixels of one of the second set of intermediate maps, each ratio indicative of a distance of a pixel from an edge in the first image bitmap.

Either of the above examples of at least one machine-readable storage medium in which the computing device is caused to create a first feature vector map including per-pixel indications of distances of each pixel from multiple lines in the first image bitmap indicated by values of corresponding pixels of each phase map of the first set of phase maps, and create a second feature vector map including per-pixel indications of distances of each pixel from multiple lines in the second image bitmap indicated by values of corresponding pixels of each phase map of a second set of phase maps corresponding to the second image bitmap.

Any of the above examples of at least one machine-readable storage medium in which the computing device caused to compare feature vector values of a pixel of the first feature vector map to feature vector values of pixels at the corresponding location and multiple locations neighboring the corresponding location in the second feature vector map to derive similarity values indicative of degree of similarity in feature vector values found in each comparison; create a similarity map including the similarity values; analyze the similarity values to determine the distance from the location of the pixel of the first feature vector map to a corresponding pixel in the second feature vector map among the pixels at the corresponding location and multiple neighboring locations in the second feature vector map; derive a disparity value from the distance; and create a disparity map including the disparity value.

Any of the above examples of at least one machine-readable storage medium in which the computing device is caused to employ the disparity map to extract visual information from at least the first image bitmap in support of at least one of stereo depth estimation between two objects depicted in the first image bitmap, estimation of a distance of an object in the first image bitmap from a vantage point of a camera used to capture the first image bitmap, stabilization of capture of at least the first image bitmap, three-dimensional modeling of an object depicted in the first image bitmap, decode of a gesture of a human depicted in the first image bitmap, and visual display of at least one or more images based at least in part on the disparity map.

The invention claimed is:

1. A device comprising:

a processor circuit; and a storage communicatively coupled to the processor circuit to store instructions that when executed by the processor circuit cause the processor circuit to:

implement a first-order wavelet filter and a second-order wavelet filter;

subject a first image bitmap captured of a scene to the first-order wavelet filter a selected number of times, an orientation of the first-order wavelet filter altered each time to create an intermediate map of a first set of intermediate maps; and subject the first image bitmap to the second-order wavelet filter the selected number of times, an orientation of the second-order wavelet filter altered each time to create an intermediate map of a second set of intermediate maps.

2. The device of claim 1, the first-order wavelet filter and the second-order wavelet filter selected to be mathematically related, and the orientations of the first-order wavelet filter and the second-order wavelet filter selected to be mathematically related such that the first-order wavelet filter approximates a sine function and the second-order wavelet filter approximates a related cosine function.

3. The device of claim 1, comprising a camera, and the processor circuit to operate the camera to capture the first image bitmap.

4. The device of claim 1, the processor circuit to receive signals from a camera conveying the first image bitmap.

5. The device of claim 1, the processor circuit to downsample the first image bitmap a selected number of levels to create at least a first downsampled bitmap.

6. The device of claim 5, the processor circuit to:

subject the first downsampled bitmap to the first-order wavelet filter the selected number of times, the orientation of the first-order wavelet filter altered each time to create another intermediate map of the first set of intermediate maps; and subject the first downsampled bitmap to the second-order wavelet filter the selected number of times, the orientation of the second-order wavelet filter altered each time to create another intermediate map of the second set of intermediate maps.

7. The device of claim 1, the processor circuit to create one of a first set of phase maps comprising per-pixel ratios of values of corresponding pixels of one of the first set of intermediate maps and values of corresponding pixels of one of the second set of intermediate maps, each ratio indicative of a distance of a pixel from an edge in the first image bitmap.

8. The device of claim 7, the processor circuit to:

create a first feature vector map comprising per-pixel indications of distances of each pixel from multiple lines in the first image bitmap indicated by values of corresponding pixels of each phase map of the first set of phase maps; and create a second feature vector map comprising per-pixel indications of distances of each pixel from multiple lines in a second image bitmap of the scene indicated by values of corresponding pixels of each phase map of a second set of phase maps corresponding to the second image bitmap.

9. The device of claim 8, the processor circuit to:

compare feature vector values of a pixel of the first feature vector map to feature vector values of pixels at the corresponding location and multiple locations neighboring the corresponding location in the second feature vector map to derive similarity values indicative of degree of similarity in feature vector values found in each comparison;

create a similarity map comprising the similarity values;

analyze the similarity values to determine the distance from the location of the pixel of the first feature vector map to a corresponding pixel in the second feature vector map among the pixels at the corresponding location and multiple neighboring locations in the second feature vector map;

derive a disparity value from the distance; and create a disparity map comprising the disparity value.

10. The device of claim 9, the processor circuit to employ the disparity map to extract visual information from at least the first image bitmap in support of at least one of stereo depth estimation between two objects depicted in the first image bitmap, estimation of a distance of an object in the first image bitmap from a vantage point of a camera used to capture the first image bitmap, stabilization of capture of at least the first image bitmap, three-dimensional modeling of an object depicted in the first image bitmap, decode of a gesture of a human depicted in the first image bitmap, and visual display of at least one or more images based at least in part on the disparity map.

11. A device comprising:

a first camera to capture a first image bitmap of a scene;

a second camera to capture a second image bitmap of the scene;

a processor circuit; and a storage communicatively coupled to the processor circuit to store instructions that when executed by the processor circuit cause the processor circuit to:

operate the first and second cameras substantially simultaneously to capture the first and second image bitmaps;

downsample the first image bitmap a selected number of levels to create at least one downsampled bitmap;

subject the first image bitmap to a first-order wavelet filter a selected number of times, an orientation of the first-order wavelet filter altered each time to create an intermediate map of a first set of intermediate maps; and subject the first image bitmap to a second-order wavelet filter the selected number of times, an orientation of the second-order wavelet filter altered each time to create an intermediate map of a second set of intermediate maps, the first-order wavelet filter and the second-order wavelet filter selected to be mathematically related, and the orientations of the first-order wavelet filter and the second-order wavelet filter selected to be mathematically related such that the first-order wavelet filter approximates a sine function and the second-order wavelet filter approximates a related cosine function.

12. The device of claim 11, the processor circuit to create one of a first set of phase maps comprising per-pixel ratios of values of corresponding pixels of one of the first set of intermediate maps and values of corresponding pixels of one of the second set of intermediate maps, each ratio indicative of a distance of a pixel from an edge in the first image bitmap.

13. The device of claim 12, the processor circuit to:

create a first feature vector map comprising per-pixel indications of distances of each pixel from multiple lines in the first image bitmap indicated by values of corresponding pixels of each phase map of the first set of phase maps; and create a second feature vector map comprising per-pixel indications of distances of each pixel from multiple lines in the second image bitmap indicated by values of corresponding pixels of each phase map of a second set of phase maps corresponding to the second image bitmap.

14. The device of claim 13, the processor circuit to:

compare feature vector values of a pixel of the first feature vector map to feature vector values of pixels at the corresponding location and multiple locations neighboring the corresponding location in the second feature vector map to derive similarity values indicative of degree of similarity in feature vector values found in each comparison;

create a similarity map comprising the similarity values;

analyze the similarity values to determine the distance from the location of the pixel of the first feature vector map to a corresponding pixel in the second feature vector map among the pixels at the corresponding location and multiple neighboring locations in the second feature vector map;

derive a disparity value from the distance; and create a disparity map comprising the disparity value.

15. The device of claim 14, comprising a display; the processor circuit to:

employ the disparity map to derive a three-dimensional model of an object of the scene; and visually present a portion of the three-dimensional model on the display.

16. The device of claim 14, the processor circuit to employ the disparity map to extract visual information from at least the first image bitmap in support of at least one of stereo depth estimation between two objects depicted in the first image bitmap, estimation of a distance of an object in the first image bitmap from a vantage point of a camera used to capture the first image bitmap, stabilization of capture of at least the first image bitmap, three-dimensional modeling of an object depicted in the first image bitmap, decode of a gesture of a human depicted in the first image bitmap, and visual display of at least one or more images based at least in part on the disparity map.

17. A computer-implemented method comprising:

receiving signals conveying a first image bitmap captured of a scene;

receiving signals conveying a second image bitmap captured of the scene;

subjecting the first image bitmap to a first-order wavelet filter a selected number of times, an orientation of the first-order wavelet filter altered each time to create an intermediate map of a first set of intermediate maps; and subjecting the first image bitmap to a second-order wavelet filter the selected number of times, an orientation of the second-order wavelet filter altered each time to create an intermediate map of a second set of intermediate maps, the first-order wavelet filter and the second-order wavelet filter selected to be mathematically related, and the orientations of the first-order wavelet filter and the second-order wavelet filter selected to be mathematically related such that the first-order wavelet filter approximates a sine function and the second-order wavelet filter approximates a related cosine function.

18. The computer-implemented method of claim 17, comprising downsampling the first image bitmap a selected number of levels to create at least a first downsampled bitmap.

19. The computer-implemented method of claim 18, comprising:

subjecting the first downsampled bitmap to the first-order wavelet filter the selected number of times, the orientation of the first-order wavelet filter altered each time to create another intermediate map of the first set of intermediate maps; and subjecting the first downsampled bitmap to the second-order wavelet filter the selected number of times, the orientation of the second-order wavelet filter altered each time to create another intermediate map of the second set of intermediate maps.

20. The computer-implemented method of claim 17, comprising creating one of a first set of phase maps comprising per-pixel ratios of values of corresponding pixels of one of the first set of intermediate maps and values of corresponding pixels of one of the second set of intermediate maps, each ratio indicative of a distance of a pixel from an edge in the first image bitmap.

21. The computer-implemented method of claim 20, comprising:

creating a first feature vector map comprising per-pixel indications of distances of each pixel from multiple lines in the first image bitmap indicated by values of corresponding pixels of each phase map of the first set of phase maps; and creating a second feature vector map comprising per-pixel indications of distances of each pixel from multiple lines in a second image bitmap indicated by values of corresponding pixels of each phase map of a second set of phase maps corresponding to the second image bitmap.

22. The computer-implemented method of claim 21, comprising comparing feature vector values of a pixel of the first feature vector map to feature vector values of pixels at the corresponding location and multiple locations neighboring the corresponding location in the second feature vector map to derive similarity values indicative of degree of similarity in feature vector values found in each comparison;

creating a similarity map comprising the similarity values;

analyzing the similarity values to determine the distance from the location of the pixel of the first feature vector map to a corresponding pixel in the second feature vector map among the pixels at the corresponding location and multiple neighboring locations in the second feature vector map;

deriving a disparity value from the distance; and creating a disparity map comprising the disparity value.

23. The computer-implemented method of claim 22, comprising employing the disparity map to extract visual information from at least the first image bitmap in support of at least one of stereo depth estimation between two objects depicted in the first image bitmap, estimation of a distance of an object in the first image bitmap from a vantage point of a camera used to capture the first image bitmap, stabilization of capture of at least the first image bitmap, three-dimensional modeling of an object depicted in the first image bitmap, decode of a gesture of a human depicted in the first image bitmap, and visual display of at least one or more images based at least in part on the disparity map.

24. At least one machine-readable storage medium comprising instructions that when executed by a computing device, cause the computing device to:

operate first and second cameras substantially simultaneously to capture first and second image bitmaps of a common scene;

downsample the first image bitmap a selected number of levels to create at least one downsampled bitmap;

subject the first image bitmap to a first-order wavelet filter a selected number of times, an orientation of the first-order wavelet filter altered each time to create an intermediate map of a first set of intermediate maps; and subject the first image bitmap to a second-order wavelet filter the selected number of times, an orientation of the second-order wavelet filter altered each time to create an intermediate map of a second set of intermediate maps, the first-order wavelet filter and the second-order wavelet filter selected to be mathematically related, and the orientations of the first-order wavelet filter and the second-order wavelet filter selected to be mathematically related such that the first-order wavelet filter approximates a sine function and the second-order wavelet filter approximates a related cosine function.

25. The at least one machine-readable storage medium of claim 24, the computing device caused to create one of a first set of phase maps comprising per-pixel ratios of values of corresponding pixels of one of the first set of intermediate maps and values of corresponding pixels of one of the second set of intermediate maps, each ratio indicative of a distance of a pixel from an edge in the first image bitmap.

26. The at least one machine-readable storage medium of claim 25, the computing device caused to:

create a first feature vector map comprising per-pixel indications of distances of each pixel from multiple lines in the first image bitmap indicated by values of corresponding pixels of each phase map of the first set of phase maps; and create a second feature vector map comprising per-pixel indications of distances of each pixel from multiple lines in the second image bitmap indicated by values of corresponding pixels of each phase map of a second set of phase maps corresponding to the second image bitmap.

27. The at least one machine-readable storage medium of claim 26, the computing device caused to:

compare feature vector values of a pixel of the first feature vector map to feature vector values of pixels at the corresponding location and multiple locations neighboring the corresponding location in the second feature vector map to derive similarity values indicative of degree of similarity in feature vector values found in each comparison;

create a similarity map comprising the similarity values;

analyze the similarity values to determine the distance from the location of the pixel of the first feature vector map to a corresponding pixel in the second feature vector map among the pixels at the corresponding location and multiple neighboring locations in the second feature vector map;

derive a disparity value from the distance; and create a disparity map comprising the disparity value.

28. The at least one machine-readable storage medium of claim 27, the processor circuit to employ the disparity map to extract visual information from at least the first image bitmap in support of at least one of stereo depth estimation between two objects depicted in the first image bitmap, estimation of a distance of an object in the first image bitmap from a vantage point of a camera used to capture the first image bitmap, stabilization of capture of at least the first image bitmap, three-dimensional modeling of an object depicted in the first image bitmap, decode of a gesture of a human depicted in the first image bitmap, and visual display of at least one or more images based at least in part on the disparity map.

* * * * *